(12) United States Patent
Jin et al.

(10) Patent No.: US 11,265,920 B2
(45) Date of Patent: Mar. 1, 2022

(54) METHOD AND DEVICE FOR PERFORMING RANDOM ACCESS PROCEDURE

(71) Applicant: Samsung Electronics Co., Ltd., Suwon-si (KR)

(72) Inventors: Seung-Ri Jin, Suwon-si (KR); Soeng-Hun Kim, Suwon-si (KR); Sang-Bum Kim, Suwon-si (KR); Dong-Gun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/651,666

(22) PCT Filed: Sep. 13, 2018

(86) PCT No.: PCT/KR2018/010760
§ 371 (c)(1),
(2) Date: Mar. 27, 2020

(87) PCT Pub. No.: WO2019/066326
PCT Pub. Date: Apr. 4, 2019

(65) Prior Publication Data
US 2020/0260496 A1 Aug. 13, 2020

(30) Foreign Application Priority Data
Sep. 27, 2017 (KR) .................. 10-2017-0125259

(51) Int. Cl.
*H04W 74/08* (2009.01)
*H04W 76/27* (2018.01)
(Continued)

(52) U.S. Cl.
CPC ....... *H04W 74/0833* (2013.01); *H04W 36/08* (2013.01); *H04W 72/042* (2013.01); *H04W 74/006* (2013.01); *H04W 76/27* (2018.02)

(58) Field of Classification Search
CPC . H04W 74/0833; H04W 76/27; H04W 36/08; H04W 72/042; H04W 74/006
See application file for complete search history.

(56) References Cited

U.S. PATENT DOCUMENTS 8,462,688 B1 * 6/2013 Dinan ................ H04W 74/006
370/312
2007/0184865 A1 * 8/2007 Phan .................... H04B 7/2681
455/509

(Continued)

FOREIGN PATENT DOCUMENTS

KR 10-2019-0028080 A 3/2019
WO 2015/135203 A1 9/2015

OTHER PUBLICATIONS

Lenovo et al., "NR Handover in Multi-Beam Operation", 3GPP TSG-RAN WG2 Meeting#99, Berlin Germany, R2-1708977, Aug. 21-25, 2017.

(Continued)

*Primary Examiner* — Jael M Ulysse
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system and a system therefor. The present disclosure can be applied to intelligent services (for example, smart home, smart building, smart city, smart car or connected car, healthcare, digital education, retail, security and safety-related services, and the like) on the basis of 5G communication technology and IoT-related technology. Disclosed is a method by which a terminal performs a random access, comprising: receiving, from a serving base station, a handover command including configuration information indicating a dedicated random access resource and a common random access resource determining whether to perform a random access by using at (Continued)

least one of the dedicated random access resource and the common random access resource according to predetermined criteria; and performing the random access on the basis of the determination result.

6 Claims, 20 Drawing Sheets

(51) Int. Cl.
*H04W 36/08* (2009.01)
*H04W 72/04* (2009.01)
*H04W 74/00* (2009.01)

(56) References Cited

U.S. PATENT DOCUMENTS

| | | | | |
|---|---|---|---|---|
| 2009/0191875 A1* | 7/2009 | Vujcic | ............... | H04W 74/0866 455/436 |
| 2010/0113051 A1* | 5/2010 | Du | ............... | H04W 74/002 455/450 |
| 2011/0170503 A1* | 7/2011 | Chun | ............... | H04W 74/006 370/329 |
| 2011/0237265 A1* | 9/2011 | Sugawara | ............... | H04L 1/1887 455/450 |
| 2012/0002606 A1* | 1/2012 | Vujcic | ............... | H04W 36/385 370/328 |
| 2012/0147830 A1* | 6/2012 | Lohr | ............... | H04W 72/042 370/329 |
| 2012/0213089 A1* | 8/2012 | Shi | ............... | H04L 5/001 370/241 |
| 2013/0157669 A1* | 6/2013 | Turtinen | ............... | H04W 48/12 455/450 |
| 2013/0242730 A1* | 9/2013 | Pelletier | ............... | H04L 1/0046 370/230 |
| 2013/0308548 A1* | 11/2013 | Kim | ............... | H04W 24/10 370/328 |
| 2013/0308606 A1* | 11/2013 | Xu | ............... | H04W 36/0066 370/331 |
| 2014/0092866 A1* | 4/2014 | Teyeb | ............... | H04W 36/0072 370/331 |
| 2014/0286305 A1* | 9/2014 | Yamada | ............... | H04W 36/165 370/331 |
| 2015/0146687 A1* | 5/2015 | Kim | ............... | H04W 76/14 370/331 |
| 2015/0236932 A1* | 8/2015 | Yu | ............... | H04L 43/0835 370/252 |
| 2016/0198368 A1* | 7/2016 | Zhang | ............... | H04W 36/0005 370/331 |
| 2016/0270121 A1* | 9/2016 | Bergstrom | ............... | H04W 74/0833 |
| 2016/0366671 A1* | 12/2016 | Ahn | ............... | H04W 72/1268 |
| 2017/0078933 A1* | 3/2017 | Li | ............... | H04W 36/0077 |
| 2018/0115940 A1* | 4/2018 | Abedini | ............... | H04W 74/006 |
| 2018/0324653 A1* | 11/2018 | Nagaraja | ............... | H04W 36/0044 |
| 2019/0045405 A1* | 2/2019 | Byun | ............... | H04W 36/24 |
| 2019/0045565 A1* | 2/2019 | Wu | ............... | H04W 76/15 |
| 2019/0182840 A1* | 6/2019 | Feng | ............... | H04W 74/0816 |
| 2019/0215828 A1* | 7/2019 | Kim | ............... | H04W 48/08 |

OTHER PUBLICATIONS

Intel Corporation; NR RACH procedures; 3GPP TSG RAN WG1 NR Adhoc#3; XP 051339737; R1-1716281 Sep. 18-21, 2017; Nagoya, Japan.
Mediatek Inc.; On 4-step RACH procedure; 3GPP TSG RAN WG1 Meeting #90; XP051316500; R1-1713701 Aug. 21-25, 2017; Prague, Czechia.
European Search Report dated Sep. 29, 2020; European Appln. No. 18863345.7-1216 / 3678434 PCT/KR2018010760.

* cited by examiner

FIG. 7

Case 1. New separate SPS confirmation for UL/SL (a) UL SPS confirmation MAC CE

| R | R | R | R | R | R | R | UL SPS ID |
|---|---|---|---|---|---|---|-----------|
| $A_1$ | $A_2$ | $A_3$ | $A_4$ | $A_5$ | $A_6$ | $A_7$ | $A_8$ |

(b) SL SPS confirmation MAC CE

| R | R | SCell ID | | SL SPS ID | | | |
|---|---|---|---|---|---|---|---|
| $C_1$ | $C_2$ | $C_3$ | $C_4$ | $C_5$ | Serving Cell Indication | $C_7$ | $C_8$ |

— SL SPS index indication

Case 2. New unified SPS confirmation

| R | R | R | SCell ID | | UL SPS ID | | |
|---|---|---|---|---|---|---|---|
| $A_1$ | $A_2$ | $A_3$ | $A_4$ | $A_5$ | $A_6$ | $A_7$ | $A_8$ |

| R | R | SCell ID | | | SL SPS ID | | |
|---|---|---|---|---|---|---|---|
| $C_1$ | $C_2$ | $C_3$ | $C_4$ | $C_5$ | $C_6$ | $C_7$ | $C_8$ |

| R | R | R | R | R | Serving Cell Indication | | |
|---|---|---|---|---|---|---|---|
| $C_1$ | $C_2$ | $C_3$ | $C_4$ | $C_5$ | $C_6$ | $C_7$ | $C_8$ |

— UL SPS index indication
— SL SPS index indication

Case 3. New common SPS confirmation

| $A_1$ | $A_2$ | $A_3$ | $A_4$ | $A_5$ | $A_6$ | $A_7$ | $A_8$ |
|---|---|---|---|---|---|---|---|

| $A_1$ | $A_2$ | $A_3$ | $A_4$ | $A_5$ | R | Serving Cell Indication | |
|---|---|---|---|---|---|---|---|
| R | R | $C_3$ | $C_4$ | $C_5$ | $C_6$ | $C_7$ | $C_8$ |

UL or SL SPS index indication by configuration (only for SCell SPS is not used)

1605

| D/C | PDCP SN | Oct 1 |
|---|---|---|
| Data | | Oct 2 |
| ... | | |

LTE: PDCP Data PDU format for
DRBs using an 7 bit SN

1610

| D/C | PDCP SN | Oct 1 |
|---|---|---|
| PDCP SN (cont.) | | Oct 2 |
| Data | | Oct 3 |
| ... | | |

LTE: PDCP Data PDU format for
DRBs using an 15 bit SN

1615

| D/C | A | R | R | PDCP SN | Oct 1 |
|---|---|---|---|---|---|
| PDCP SN (cont.) | | | | | Oct 2 |
| Data | | | | | Oct 3 |
| ... | | | | | |

LTE: PDCP Data PDU format for
DRBs using an 12 bit SN

1620

| D/C | P | A | R | R | R | PDCP SN | Oct 1 |
|---|---|---|---|---|---|---|---|
| PDCP SN (cont.) | | | | | | | Oct 2 |
| PDCP SN (cont.) | | | | | | | Oct 3 |
| Data | | | | | | | Oct 4 |
| ... | | | | | | | |

LTE: PDCP Data PDU format for
DRBs using an 18 bit SN

1625

| D/C | A | R | R | PDCP SN | Oct 1 |
|---|---|---|---|---|---|
| PDCP SN (cont.) | | | | | Oct 2 |
| Data | | | | | Oct 3 |
| ... | | | | | |
| MAC-I (optional) | | | | | Oct N-3 |
| MAC-I (cont.) (optional) | | | | | Oct N-2 |
| MAC-I (cont.) (optional) | | | | | Oct N-1 |
| MAC-I (cont.) (optional) | | | | | Oct N |

NR: PDCP Data PDU format for
DRBs with 18 bits PDCP SN

1630

| D/C | A | R | R | R | R | PDCP SN | Oct 1 |
|---|---|---|---|---|---|---|---|
| PDCP SN (cont.) | | | | | | | Oct 2 |
| PDCP SN (cont.) | | | | | | | Oct 3 |
| Data | | | | | | | Oct 4 |
| ... | | | | | | | |
| MAC-I (optional) | | | | | | | Oct N-3 |
| MAC-I (cont.) (optional) | | | | | | | Oct N-2 |
| MAC-I (cont.) (optional) | | | | | | | Oct N-1 |
| MAC-I (cont.) (optional) | | | | | | | Oct N |

NR: PDCP Data PDU format for
DRBs with 18 bits PDCP SN

FIG.16

METHOD AND DEVICE FOR PERFORMING RANDOM ACCESS PROCEDURE

CROSS-REFERENCE TO RELATED APPLICATION(S)

This application is a National Phase Entry of PCT International Application No. PCT/KR2018/010760, which was filed on Sep. 13, 2018 and claims priority to Korean Patent Application No. 10-2017-0125259, which was filed on Sep. 27, 2017, the contents of which are incorporated herein by reference.

BACKGROUND

1. Field

The disclosure relates generally to a mobile communication system and, more particularly, to a method and an apparatus for performing semi-persistent scheduling by an LTE UE supporting Vehicle-to-Everything (V2X) communication.

The disclosure relates to operation of a UE and a base station in a mobile communication system.

2. Description of the Related Art

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate a propagation path loss in the mmWave band and increase propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has evolved to an Internet of Things (IoT) network in which distributed components such as objects exchange and process information from a human-oriented connection network in which humans generate and consume information. Internet of Everything (IoE) technology may be an example of a combination of IoT technology and big data processing technology through a connection with a cloud server.

In order to implement the IoT, research is being conducted on technical factors such as a sensing technique, wired/wireless communication and network infrastructure, service interface technology, and security technology which are required, and thus technologies such as a sensor network, Machine to Machine (M2M), Machine Type Communication (MTC), and the like for a connection between objects are being researched.

In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, 5G communication technologies such as sensor network, M2M communication, and MTC are implemented by beamforming, MIMO, and an array antenna scheme. The application of a cloud RAN as the big data processing technology may be an example of convergence of the 5G technology and the IoT technology.

Vehicle-to-Everything (V2X) is a general term that refers to all types of communication schemes applicable to a means of transportation located on a road, for example, a vehicle and means a specific communication technology for implementing a "Connected Vehicle" or "Networked Vehicle". The V2X networking is divided into three types, that is, Vehicle-to-Infrastructure (V2I) communication, Vehicle-to-Vehicle (V2V) communication, and Vehicle-to-Pedestrian (V2P) communication.

The disclosure provides an efficient communication method and apparatus in a wireless communication system supporting V2X communication.

According to the disclosure, after transmitting an activation/deactivation signal for operation of semi-persistent scheduling in a plurality of uplinks and sidelinks to a UE supporting V2X communication, a base station may repeatedly transmit the activation/deactivation signal because the base station does not have information indicating that the UE has successfully received the corresponding signal.

The disclosure proposes an operation in which the UE receives all of dedicated random access resources and common random access resources when the UE performs a handover from a serving cell to a target cell in a next-generation mobile communication system.

According to the disclosure, the UE indicates that a specific data packet needs a local cache to assist the base station using the local cache in a next-generation mobile communication system, thereby reducing loads of the base station executing the local cache.

In accordance with an aspect of the disclosure, a method of supporting proximity communication by a UE is provided. The method includes: receiving information indicating Semi-Persistent Scheduling (SPS)-related configuration information from a base station; generating supporting information on the basis of the received control information and transmitting the supporting information to the base station; receiving downlink control information generated on the basis of the supporting information; and transmitting and receiving data to and from the base station on the basis of the downlink control information.

In accordance with another aspect of the disclosure, a method of supporting a handover by a UE is provided. The method includes: configuring a timer on the basis of whether information indicating whether a handover starts is received;

selecting transmission resources to be used for random access on the basis of whether the timer expires; and performing random access using the selected transmission resources.

In accordance with another aspect of the disclosure, a method of supporting a handover by a UE is provided. The method includes: receiving control information from a base station; determining whether the received control information includes information indicating whether a local cache is applied; and transmitting uplink data to the base station on the basis of a result of the determination.

In accordance with another aspect of the disclosure, a method of supporting a handover by a serving base station is provided. The method includes: receiving data from a UE; and storing the received data in a local cache or transferring the received data to a higher layer on the basis of whether the UE supports the local cache.

In accordance with another aspect of the disclosure, a method of performing random access by a UE is provided. The method includes: receiving a handover command including configuration information indicating dedicated random access resources and common random access resources from a serving base station; determining whether to perform the random access using at least one of the dedicated random access resources and the common random access resources according to a predetermined reference; and performing the random access on the basis of a result of the determination.

In accordance with another aspect of the disclosure, a method of supporting random access of a UE by a serving base station is provided. The method includes: transmitting configuration information related to random access of the UE to the UE; receiving cell measurement information from the UE; and transmitting a handover command in which dedicated random access resources and common random access resources are configured to the UE, wherein the handover command includes a first timer for dedicated random access and a second timer for common random access.

In accordance with another aspect of the disclosure, a method of supporting random access of a UE by a target base station is provided. The method includes: receiving a handover command from a serving base station; receiving cell measurement information from the UE; and performing random access with the UE using at least one of dedicated random access resources and common random access resources.

A UE and a base station exchange the accurate operation time point of semi-persistent scheduling due to a new operation for identifying semi-persistent scheduling in V2X communication proposed by the disclosure, thereby reducing UE power loss generated by unnecessary transmission of a control signal and monitoring of the control signal.

The disclosure provides an efficient procedure to use random access resources for a handover by defining the overall operation of the UE in both cases of dedicated random access resources and common random access resources through determination of resources to be used for random access in a next-generation mobile communication system and introduction of a new timer for effectively using dedicated random access resources and common random access resources.

Through a method of applying a local cache with UE's assistance proposed by the disclosure, the base station may inspect only some data packets designated by the UE without identifying whether the local cache is designated to all data packets, thereby significantly reducing processing load generated by identifying the local cache.

BRIEF DESCRIPTION OF THE DRAWINGS

FIG. 7 illustrates the structure of an uplink/sidelink SPS confirmation MAC CE proposed by the disclosure;

FIG. 16 illustrates the structure of a data packet in which the local cache is performed with help from the UE proposed by the disclosure;

Figure 1:
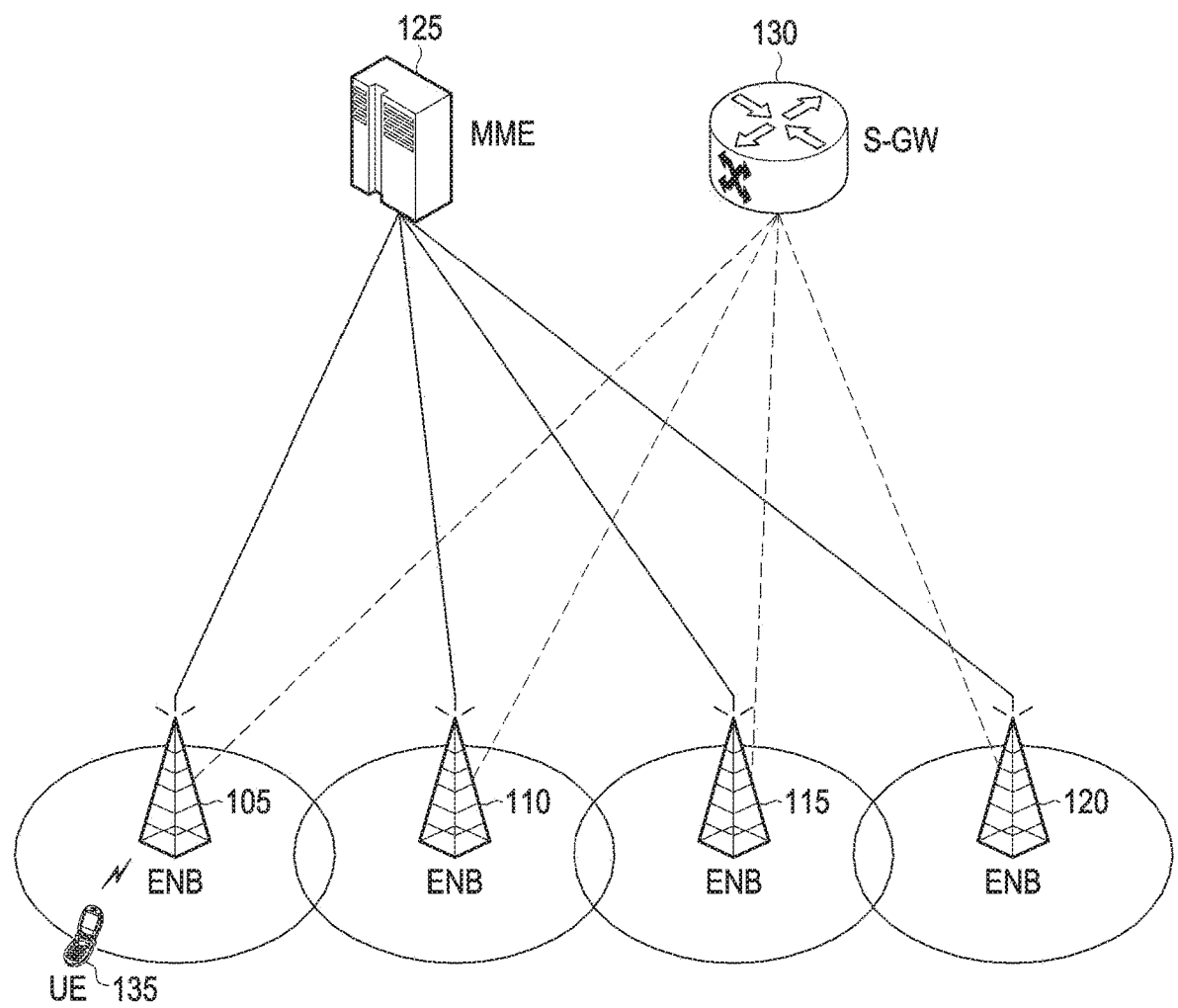
FIG. 1 illustrates the structure of an LTE system.

Hereinafter, the operating principle of the disclosure will be described in detail with reference to the accompanying drawings. In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification. In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3rd-Generation Partnership Project, Long-Term Evolution (3GPP LTE) standard or terms and names changed on the basis thereof. However, the disclosure may not be limited by the terms and names, and may be equally applied to a system that is based on another standard.

Prior to the detailed description of the disclosure, the term "first" and "second" may be used to describe various elements throughout the specification, but elements should not be limited by the terms. The terms are used merely for the purpose to distinguish an element from the other elements. As used herein, the singular forms are intended to include the plural forms as well, unless the context clearly indicates otherwise. In the entire specification of the present application, when it is described that a certain unit "includes" a certain element, this means that the unit may include any other element rather than exclude the any other element unless otherwise described. The term "unit" used in the specification refers to software or a hardware element such as a Field-Programmable Gate Array (FPGA) or an Application Specific Integrated Circuit (ASIC), and the "unit" plays some roles. However, the "unit" does not always have a meaning limited to software or hardware. The "unit" may be included in a storage medium capable of address or may be configured to reproduce one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided by elements and "units" may be combined by a smaller number of elements and "units" or may be further divided into additional elements and "units".

FIG. 1 illustrates the structure of an LTE system.

Referring to FIG. 1, a radio access network of the LTE system includes next-generation Evolved Node Bs (hereinafter, referred to as eNBs, Node Bs, or base stations) 105, 110, 115 and 120, a Mobility Management Entity (MME) 125, and a Serving-Gateway (S-GW) 130. A User Equipment (UE) 135 (or a terminal) may access an external network through the eNBs 105 to 120 and the S-GW 130.

In FIG. 1, the eNBs 105 to 120 correspond to the existing node Bs of the UMTS system. The eNB is connected with the UE 135 through a radio channel, and performs a more complicated role than the conventional node B. In the LTE system, since all user traffic including a real time service such as a Voice over IP (VoIP) through an Internet protocol are serviced through a shared channel, an apparatus for collecting and scheduling status information on buffer statuses of UEs, available transmission power status, and channel statuses is required, and the eNBs 105 to 120 serve as this apparatus. One eNB generally controls plural cells. In order to implement a transmission rate of 100 Mbps, the LTE system uses an Orthogonal Frequency Division Multiplexing (OFDM) as a wireless access technology in a bandwidth of 20 MHz. Further, a modulation scheme and an Adaptive Modulation and Coding (hereinafter, referred to as an AMC) scheme of determining a channel coding rate are applied to the LTE system in correspondence to a channel status of the UE. The S-GW 130 is a device for providing a data bearer, and generates or removes the data bearer under a control of the MME 125. The MME is a device for performing not only a function of managing mobility of the UE but also various control functions and is connected to a plurality of eNBs.

Figure 2:
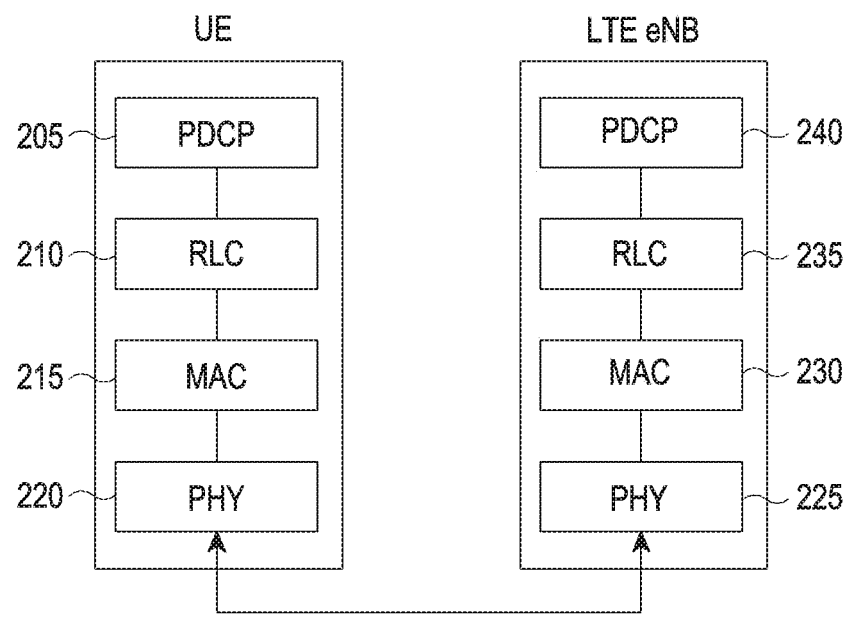
FIG. 2 illustrates a wireless protocol structure in the LTE system.

FIG. 2 illustrates a wireless protocol structure in the LTE system.

Referring to FIG. 2, the UE and the eNB includes Packet Data Convergence Protocols (PDCPs) 205 and 240, Radio Link Controls (RLCs) 210 and 235, Medium Access Controls (MACs) 215 and 230, respectively, in the wireless protocol of the LTE system. The PDCPs 205 and 240 perform an operation such as compressing/decompressing an IP header. The main function of the PDCP is as shown in [Table 1] below.

TABLE 1

Header compression and decompression function (Header compression and decompression: ROHC only)
User data transmission function (Transfer of user data)
Sequential delivery function (In-sequence delivery of upper layer PDUs at PDCP re-establishment procedure for RLC AM)
Sequence re-arrangement function (For split bearers in DC (only support for RLC AM): PDCP PDU routing for transmission and PDCP PDU reordering for reception)
Duplicate detection function (Duplicate detection of lower layer SDUs at PDCP re-establishment procedure for RLC AM)
Retransmission function (Retransmission of PDCP SDUs at handover and, for split bearers in DC, of PDCP PDUs at PDCP data-recovery procedure, for RLC AM)
Ciphering and deciphering function (Ciphering and deciphering)
Timer-based SDU removal function (Timer-based SDU discard in uplink)

Radio Link Controls (RLCs) 210 and 235 reconfigure the PDCP Packet Data Unit (PDU) to be the proper size and perform an ARQ operation. The main function of the RLC is as shown in [Table 2] below.

TABLE 2

Data transmission function (Transfer of upper layer PDUs)
ARQ function (Error Correction through ARQ (only for AM data transfer))
Concatenation, segmentation, and reassembly function (Concatenation, segmentation and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer))
Duplication detection function (only for UM and AM data transfer))
Error detection function (Protocol error detection (only for AM data transfer))
RLC SDU deletion function (RLC SDU discard (only for UM and AM data transfer))
RLC re-establishment function (RLC re-establishment)

The MACs 215 and 230 are connected with various RLC layer devices configured in one UE, and perform an operation of multiplexing RLC PDUs to the MAC PDU and de-multiplexing the RLC PDUs from the MAC PDU. The main functions of the MAC are as shown in [Table 3].

TABLE 3

Mapping function (Mapping between logical channels and transport channels)
Multiplexing and demultiplexing function (Multiplexing/demultiplexing of MAC SDUs belonging to one or different logical channels into/from transport blocks (TB) delivered to/from the physical layer on transport TABLE 3-continued channels)
Scheduling information report function (Scheduling information reporting)
Hybrid automatic repeat request (HARQ) function (error correction through HARQ)
Logical channel priority control function (Priority handling between logical channels of one UE)
UE priority control function (Priority handling between UEs by means of dynamic scheduling)
Multimedia Broadcast Multicast Service (MBMS) service identification function (MBMS service identification)
Transport format selection function (Transport format selection)
Padding function (Padding)

The PHY layers 220 and 225 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
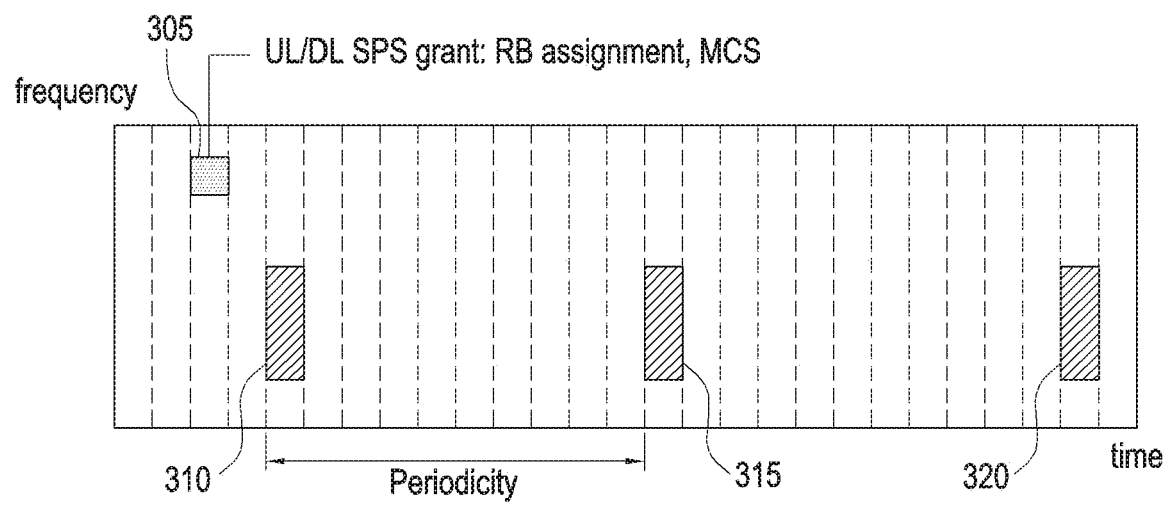
FIG. 3 illustrates a semi-persistent scheduling operation in the LTE system.

FIG. 3 illustrates a semi-persistent scheduling operation in the LTE system.

Semi-Persistent Scheduling (SPS) in the LTE system is a method used to schedule services in which a small amount of data is frequently generated and is needed to reduce an amount of control information that increases in proportion to the number of users and to secure a system capacity for transmitting user data. Particularly, in the LTE system, SPS is used for a Voice over Internet Protocol (VoIP). Basically, the eNB transfers common configuration information for SPS to the UE through an RRC control message and indicates activation/deactivation of the configured SPS through Downlink Control Information (DCI) transmitted through a PDCCH. That is, the SPS is a method by which the eNB transmits uplink/downlink resource allocation control information 305 to the UE once and the eNB and the UE perform an operation for data 310 to 320 generated in the future according to the transmitted control information. That is, the SPS in the LTE allocates one transmission resource for MAC Protocol Data Unit (PDU) transmission in every period. The resources allocated by the control information are valid before SPS activation or SPS deactivation (or release) is generated. Meanwhile, uplink SPS may be deactivated when the UE and the eNB implicitly have no data transmission through SPS transmission resources for a preset number of times (N times). That is, if there is no data to be transmitted through resources corresponding to the configured SPS configuration period, the UE may pad and transmit 0 including a padding Buffer Status Report (BSR) and a Power Headroom Report (PHR).

The uplink/downlink SPS operation in the LTE system is described below.

The eNB configures a parameter for the SPS operation in the UE through the RRC control message. The RRC control message may include at least one of an SPS C-RNTI, an SPS period (semiPersistSchedIntervalDL, semiPersistSchedIntervalUL), and a maximum number of HARQ processes for SPS (numberOfConfSPS-Processes, numberOfConfUl-SPS-Processes).

When the uplink/downlink SPS is configured, the eNB transmits a Downlink Control Information (DCI) format including the downlink resource allocation control information 305 to the UE on the basis of an SPS C-RNTI of a Physical Downlink Control Channel (PDCCH). The DCI may include at least one of an allocation type (FDD/TDD), an MCS level, a New Data Indicator (NDI), a Redundancy Version (RV), an HARQ process number, and resource allocation (resource block assignment) information of data. Meanwhile, DCI format 0 is used to activate/deactivate the uplink SPS, and DCI formats 1/1A/2/1a/1b/1c are used to activate/deactivate the downlink SPS. This will be described with reference to [Table 4] and [Table 5] below.

TABLE 4

<DCI configuration for SPS activation>

| | DCI Format 0 | DCI Format 1/1A | DCI Format 2/1a/1b/1c |
|---|---|---|---|
| TPC command for scheduled PUSCH' | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD set to '0000' | FDD: set to '000' TDD set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 5

<DCI configuration for SPS deactivation>

| | DCI Format 0 | DCI Format 1/1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | set to all '1' | N/A |
| HARQ process number | N/A | FDD: set to '000' TDD: set to '0000' |
| Modulation and coding scheme | N/A | set to '1111' |
| Redundancy version | N/A | set to '00' |
| Resource block assignment | N/A | set to all '1' |

When the uplink SPS operation is applied to a V2X UE, a maximum of 8 traffics can be simultaneously configured and activated. In order to support the same, an index is given to each SPS configuration, and the corresponding index is included in and indicated by the DCI of the PDCCH when the uplink SPS operation is activated/deactivated.

Figure 4:
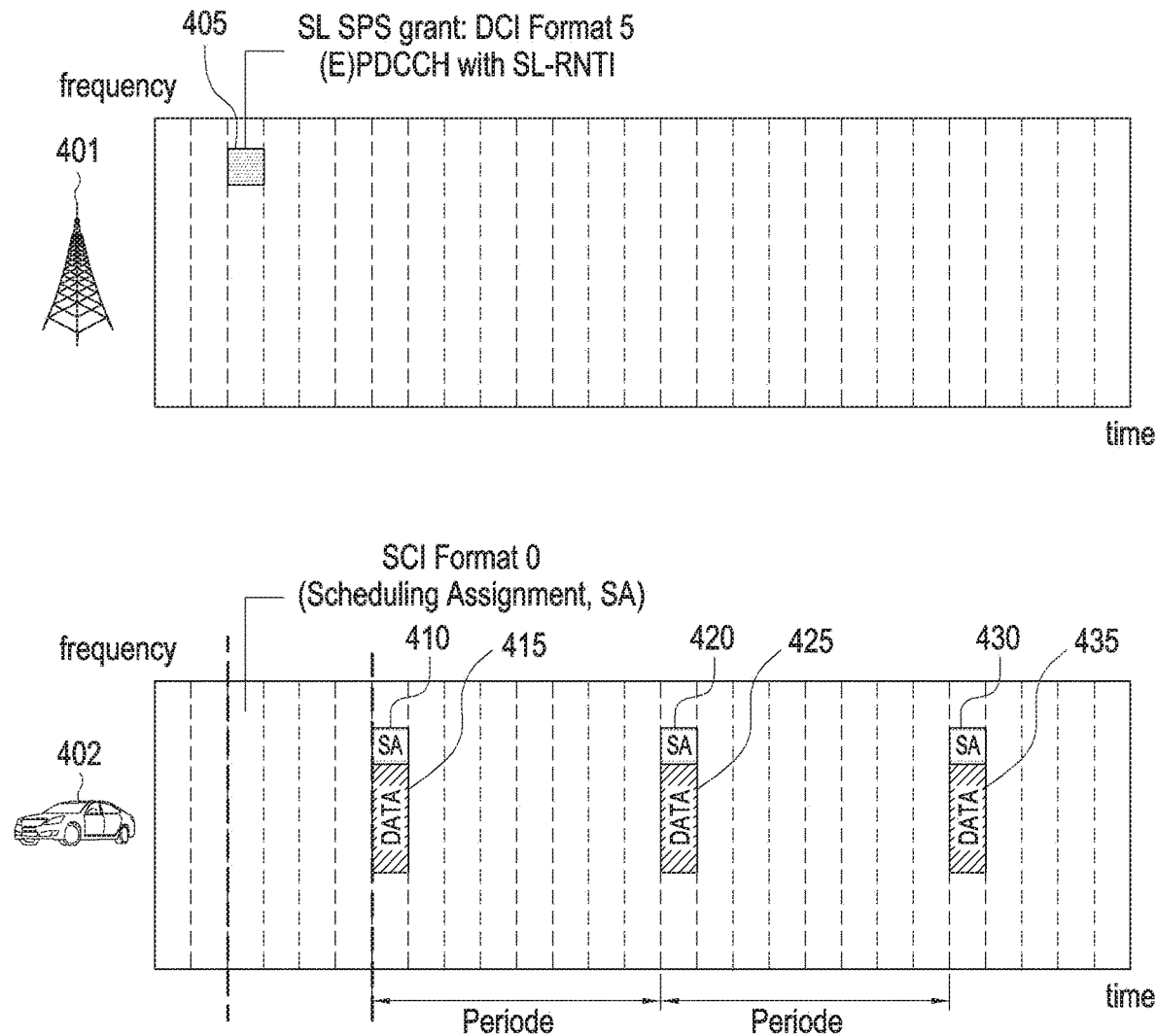
FIG. 4 illustrates a sidelink semi-persistent scheduling operation in an LTE V2X system.

FIG. 4 illustrates a sidelink semi-persistent scheduling operation in an LTE V2X system.

In the case of a UE 402 supporting V2V, frequent generation of a large number of pieces of data is expected within a service area. That is, when dynamic scheduling corresponding to the convention Rel-12 D2D resource allocation method is applied, the generation of resource allocation control information increases and thus resources to transmit user data are reduced. The SPS in V2V is a method by which an eNB 401 transmits resource allocation control information 405 of a sidelink corresponding to a link between UEs to the UE 402 once and the eNB and the UE perform the SPS operation for Scheduling Assignment (SA) 410, 420, and 430, and data 415, 425, and 435 generated in the future according to the transmitted control information. The number of transmissions of the SA and the data has a fixed value and may be 1 or 2. That is, the SPS in the SL allocates one or more transmission resources for SA and data transmission in every period. Further, the resources allocated by the control information are valid before SPS activation or SPS deactivation (or release) is generated. The SPS is compared with the conventional SPS. In the conventional SPS, one transmission resource is implicitly allocated according to a predetermined period and the transmission resource is for L2 transmission (or MAC PDU transmission). However, in the SPS of V2V, one or two transmission resources are allocated according to a predetermined period (or in every period) and the transmission resources are for SA and data transmission.

Further, a maximum of 8 SL SPSs can be configured in the UE, and a maximum of 8 SL SPSs may be activated and operated. The eNB configures configurations having 8 different SPS characteristics (for example, period, traffic type, and priority) for each index and indicates activation/deactivation through DCI of the PDCCH according to a request from the UE. Meanwhile, the UE receiving the signal carries data on resources configured according to the corresponding SPS configuration period to transmit the data.

In V2X, data tends to be periodically transmitted. This means that V2X traffic mainly broadcasts a Rel-14 reference safety-related message to neighboring UEs. That is, the UE may periodically transmit data on its own location, a speed, and a UE state related to safety to neighboring UEs, and if the SPS operation is performed therefor, may reduce unnecessary transmission/reception of a control signal. In the V2X system, the SPS operation is divided into uplink SPS and sidelink SPS, and each will be briefly described with reference to FIGS. 3 and 4. First, a characteristic of the uplink SPS is described. The uplink SPS basically has an operation mechanism which is the same as or similar to that of the uplink SPS in the conventional LTE. That is, transmission/reception between the eNB and the UE is performed according to a predetermined period and through predetermined resources, and the eNB controls transmission resources. The eNB monitors uplink SPS resources transmitted by the UE and thus supports an implicit SPS release function. When the UE does not transmit data through SPS resources during a preset number of empty transmissions, both the UE and the eNB may perform SPS release and recognize it through the implicit SPS release function. Further, the eNB may explicitly indicate the release of the corresponding SPS operation to the UE through the PDCCH on the basis of recognition of uplink/downlink traffic (VoIP).

On the other hand, in the case of the sidelink SPS operation in the V2X system, data transmission/reception is performed only between UEs, and thus the eNB cannot identify whether SPS resources are actually transmitted even though the eNB allocates the corresponding SPS resources. For such a reason, when the UE has no data to be transmitted in the sidelink, padding or a MAC CE such a padding BSR is not added for configured transmission resources and transmission of the transmission resources is skipped. This is similar to an SPS skip operation in the LTE system. However, there is a difference in that the skip operation is basically performed without any configuration of the eNB. Since the eNB has no data transmission/reception information for the sidelink, the eNB may need UE's help in order to allocate and control resources for the sidelink SPS. The UE may help the eNB in configuring and activating the SPS by transmitting a UE assistance information RRC message including traffic-related information (for example, preferred period, offset, packet type, and message size). The control message may be used to provide not only information for the sidelink SPS but also information of uplink SPS.

According to the disclosure, a need for an SPS confirmation signal for uplink SPS and sidelink SPS in the V2X system is described and an appropriate structure thereof is proposed.

Figure 5:
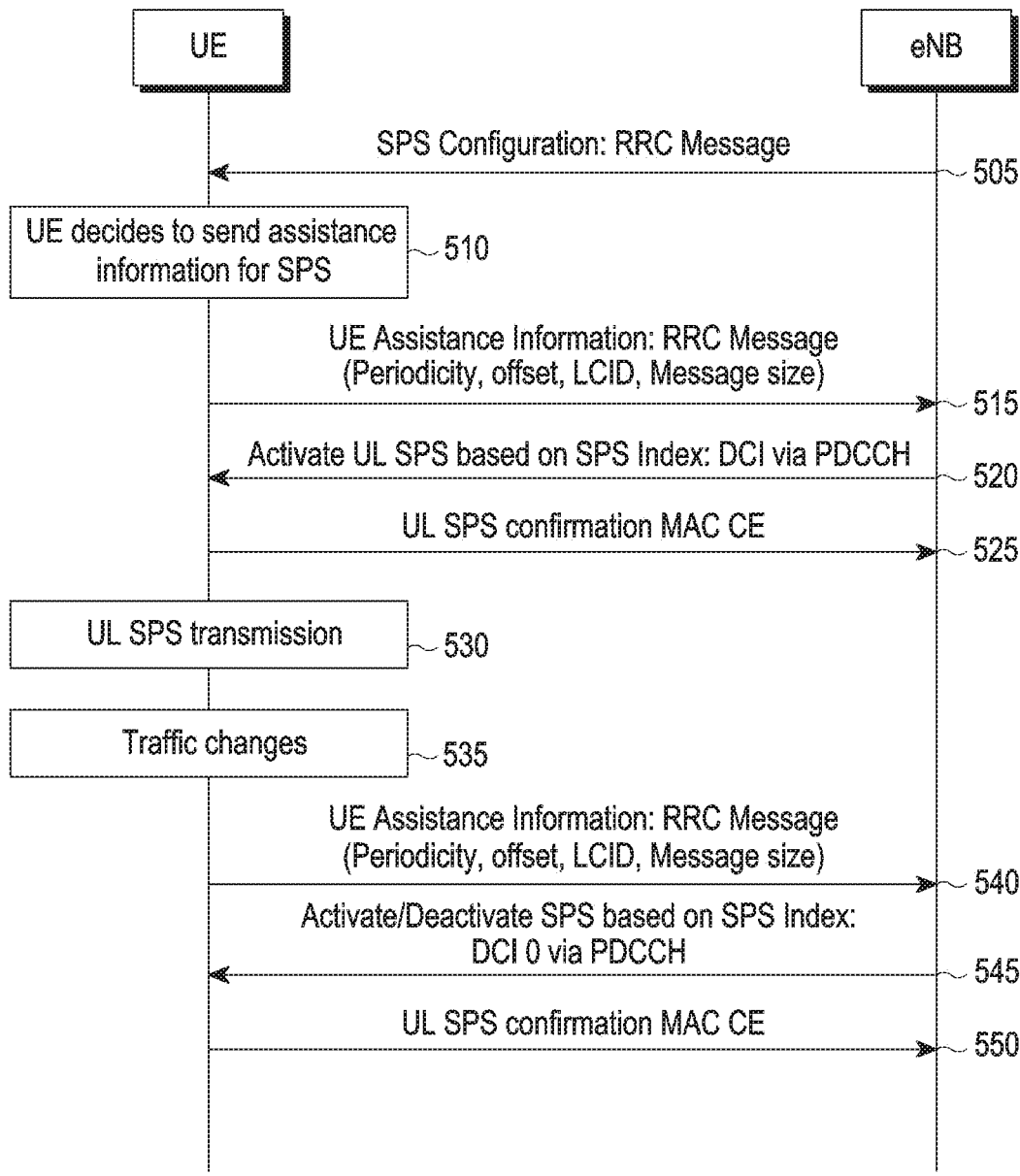
FIG. 5 illustrates a diagram to which an uplink SPS confirmation operation is applied in the V2X system to which the disclosure is applied.

FIG. 5 illustrates a diagram to which an uplink SPS confirmation operation is applied in the V2X system to which the disclosure is applied.

The UE receives SPS-related configuration information from the eNB through the RRC message in step 505. The configuration message is information effective for (applied to) in common a serving cell (or a plurality of serving cells) in which uplink SPS is configured, and may include at least one piece of information shown in [Table 6] below.

TABLE 6

Uplink SPS V-RNTI: SPS transmission activation/retransmission/reactivation/release may be indicated through a PDCCH and refers to an identifier specifying the UE at this time
Sidelink SPS V-RNTI: SPS transmission activation/retransmission/reactivation/release may be indicated through a PDCCH and refers to an identifier specifying the UE at this time
Uplink/sidelink SPS configuration index: indicates an index for distinguishing SPS configurations having different characteristics
Uplink/sidelink SPS interval: indicates a period on which uplink SPS transmission resources are allocated Meanwhile, the configuration information is information required to distinguish between respective uplink/sidelink SPSs, and the UE knows whether the uplink/sidelink SPS operation is performed according to the received SPS V-RNTI type and knows a period on which an uplink/sidelink SPS index included in an activation/deactivation signal indicated by the PDCCH is transmitted. The PDCCH signal may also include resource information that should be transmitted. Further, a maximum of 8 uplink/sidelink SPSs can be activated at the same time.

When specific traffic is activated, that is, when the UE has data to be transmitted, the UE generates UE assistance information including information (for example, periodicity, offset, LCID, and message size) containing a characteristic of the corresponding traffic in step 510 and transfers the UE assistance information to the eNB in step 515.

The eNB collects information on uplink SPS through the UE assistance information which the UE transmits and indicates activation of each traffic through DCI of the PDCCH in step 520. If the SPS skip operation is performed on the uplink SPS, an operation is needed for indicating that, after the UE receives an activation signal, the UE has successfully received the activation signal and the skip operation can be performed on the future uplink SPS resources. The conventional LTE has the structure in which there is no information in payload of the SPS confirmation MAC CE and information is indicated through the LCID because only one SPS is applied once. However, the V2X uplink SPS needs a new structure for identifying which uplink SPS activation information is received because a maximum of 8 SPSs are activated at the same time.

The UE properly configures the SPS confirmation MAC CE having the new structure (mark an SPS index receiving the activation signal) and transfers the SPS confirmation MAC CE to the eNB in step 525.

The UE transmits data according to the configured uplink SPS configuration in step 530 and, when information on specific SPS traffic is changed, detects the change and reflects the changed traffic information in the UE assistance information in step 535. The corresponding changed information corresponds to traffic periodicity, offset, message size change, or specific traffic release.

The UE transfers an updated UE assistance information message to the eNB in step 540, and the eNB transmits an uplink SPS activation/deactivation signal to the UE on the basis of the information received from the UE in step 545.

If the SPS skip operation is activated, the UE is required identify whether the SPS is released after the deactivation signal is received from the eNB or transmission resources are skipped due to no data to be transmitted and thus needs to transmit the new SPS confirmation MAC CE in step 550. When the eNB receives the corresponding signal, the eNB may know that the release of the specific uplink SPS is applied to the UE and may allocate the corresponding resources to another UE or allocate other transmission resources.

Figure 6:
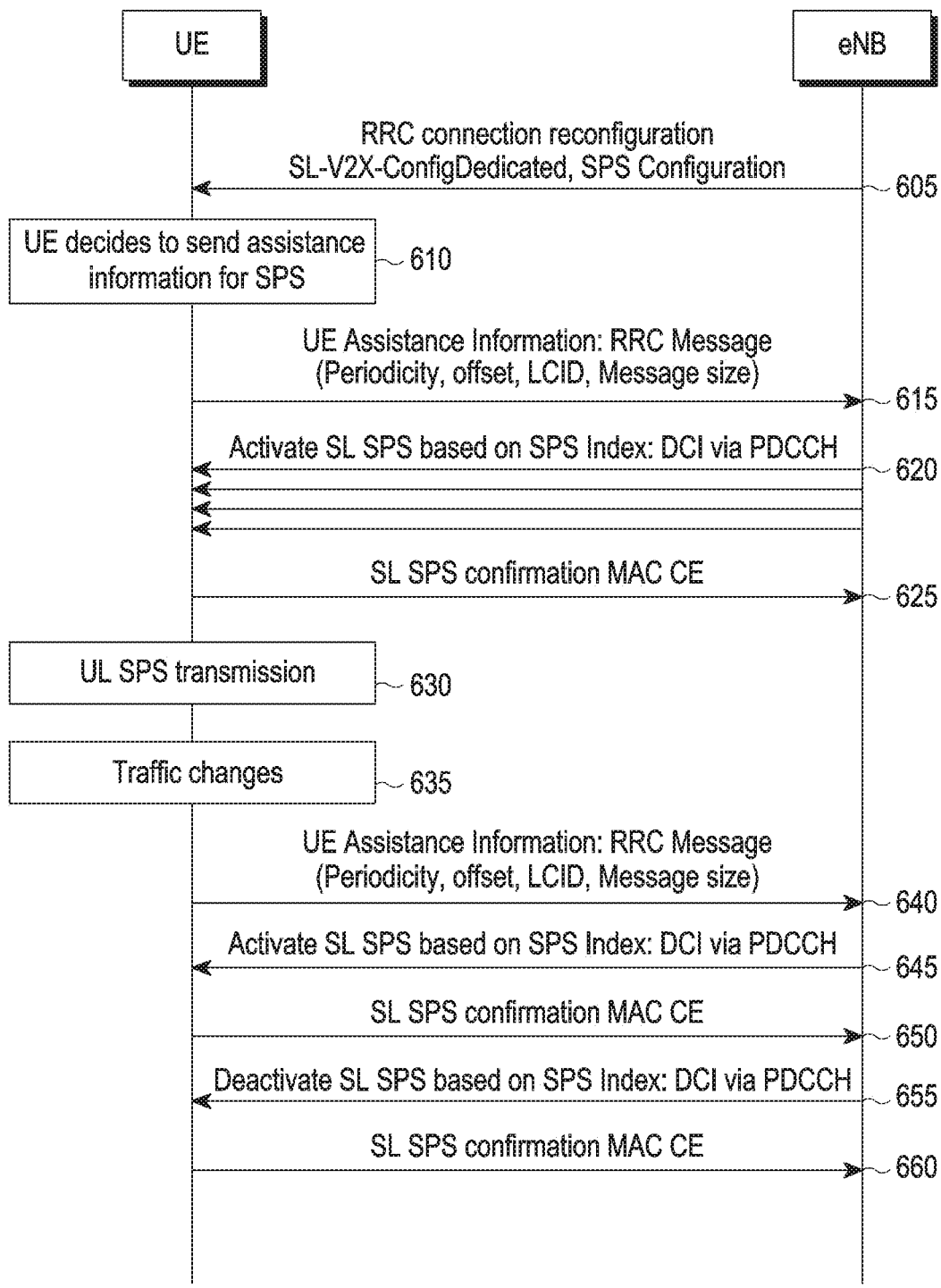
FIG. 6 illustrates a diagram to which a sidelink SPS confirmation operation is applied in the V2X system to which the disclosure is applied.

FIG. 6 illustrates a diagram to which a sidelink SPS confirmation operation is applied in the V2X system to which the disclosure is applied.

In the case of the UE supporting the V2X service, sidelink communication may be largely divided into a mode in which the configuration is received from the eNB and a mode in which the UE autonomously operates. The disclosure only considers the mode in which the configuration is received from the eNB.

The UE receives SPS-related configuration information from the eNB through the RRC message in step 605. The configuration information is information effective for (applied to) in common a service cell (or a plurality of serving cells) in which sidelink SPS is configured, and may include at least one piece of information shown in [Table 7] below.

TABLE 7

Uplink SPS V-RNTI: SPS transmission activation/retransmission/reactivation/release may be indicated through a PDCCH and refers to an identifier specifying the UE at this time
Sidelink SPS V-RNTI: SPS transmission activation/retransmission/reactivation/release may be indicated through a PDCCH and refers to an identifier specifying the UE at this time
Uplink/sidelink SPS configuration index: indicates an index for distinguishing SPS configurations having different characteristics
Uplink/sidelink SPS interval: indicates a periodicity on which uplink SPS transmission resources are allocated Meanwhile, the configuration information is information required to distinguish between respective uplink/sidelink SPSs, and the UE knows whether the uplink/sidelink SPS operation is performed according to the received SPS V-RNTI type and knows a period on which an uplink/sidelink SPS index included in an activation/deactivation signal indicated by the PDCCH is transmitted. The PDCCH signal may also include resource information that should be transmitted. Further, a maximum of 8 uplink/sidelink SPSs can be activated at the same time.

When specific traffic is activated, that is, when the UE has data to be transmitted, the UE generates UE assistance information including information (for example, periodicity, offset, Prose Packet Per Priority (PPPP), and message size) containing a characteristic of the corresponding traffic in step 610 and transfers the UE assistance information to the eNB in step 615.

The eNB collects information on sidelink SPS through the UE assistance information which the UE transmits and indicates activation of each traffic through DCI of the PDCCH in step 620. Since the SPS skip operation is basically performed on the sidelink SPS, an operation indicating that, after the UE receives an activation signal, the UE has successfully received the activation signal and the skip operation can be performed on sidelink SPS resources is needed. If the operation does not exist, the eNB cannot know if the UE successfully receives the PDCCH signal or properly performs the sidelink SPS operation at all. Accordingly, it is expected that the eNB repeatedly transmits the PDCCH signal according to implementation by the eNB in which case unnecessary control messages are transmitted in the air and thus problems such as resource waste and UE monitoring power waste may occur.

The conventional LTE has the structure in which there is no information in payload of the SPS confirmation MAC CE and information is indicated through the Logical Channel Identifier (LCID) because only one SPS is applied once. However, the V2X sidelink SPS needs a new structure for identifying which uplink SPS activation information is received because a maximum of 8 SPSs are activated at the same time. Further, if the sidelink SPS is applied not only to a PCell but also to an SCell, a method of distinguishing serving cells should be contained.

The UE properly configures the SPS confirmation MAC CE having the new structure (marks an SPS index receiving the activation signal, and if there is serving cell information, also marks the corresponding serving cell index) and transfers the configuration to the eNB in step 625. The UE transmits data according to the configured sidelink SPS configuration in step 630 and, when information on specific SPS traffic is changed, detects the change and reflects the changed traffic information in the UE assistance information in step 635. The corresponding changed information corresponds to traffic periodicity, offset, message size change, or specific traffic release.

The UE transfers an updated UE assistance information message to the eNB in step 640, and the eNB transmits a sidelink SPS activation/deactivation signal to the UE on the basis of the information received from the UE in steps 645 and 655.

The UE is required to identify whether the SPS is activated/deactivated after the activation/deactivation signal is received from the eNB or transmission resources are skipped due to no data to be transmitted and thus needs to transmit the new SPS confirmation MAC CE in steps 650 and 660. If the operation does not exist for the deactivation signal, the eNB cannot know if the UE successfully receives the PDCCH signal or properly releases the sidelink SPS operation at all. Accordingly, it is expected that the eNB repeatedly transmits the PDCCH signal according to implementation by the eNB in which case unnecessary control messages are transmitted in the air and thus problems such as resource waste and UE monitoring power waste may occur. When the eNB receives the corresponding signal, the eNB may know that the UE releases the specific sidelink SPS and may allocate the corresponding resources to another UE or allocate other transmission resources.

FIG. 7 illustrates the structure of an uplink/sidelink SPS confirmation MAC CE proposed by the disclosure. The reason why the SPS confirmation operation is needed for the V2X uplink/sidelink SPS operation is described below.

In the case of V2X SPS, a maximum of 8 SPSs having different configurations may be activated at the same time.

In the case of sidelink, if the SPS skip operation is applied and the SPS skip operation is configured for uplink according to a configuration, after DCI is received through the PDCCH, it is required to identify whether the UE properly performs activation/deactivation.

For such a reason, the confirmation operation is needed for the V2X SPS operation, which corresponds to a structure different from that defined in conventional LTE. A new uplink/sidelink SPS confirmation MAC CE structure is proposed below in detail.

Case 1: New-Typed Independent Uplink/Sidelink SPS Confirmation MAC CE

Reference numerals 701 and 705 indicate the uplink SPS confirmation MAC CE structures. In conventional LTE, an LCID indicating the uplink SPS confirmation MAC CE is included in a MAC subheader, and payload has no information. The uplink SPS confirmation MAC CE for V2X has been newly defined. That is, a new LCID has introduced and the corresponding payload includes an uplink SPS index. Reference numeral 701 indicates a method of expressing specified uplink SPS index information by integers of 3 bits, and reference numeral 705 indicates a method of marking a plurality of pieces of uplink SPS index information on a bitmap.

Reference numerals 710 and 715 indicate the sidelink SPS confirmation MAC CE structures. The sidelink has no conventional SPS confirmation MAC CE and thus a new sidelink SPS confirmation MAC CE should be designed. That is, a new LCID corresponding to the sidelink SPS confirmation MAC CE may be introduced and indicated by a MAC subheader. The corresponding payload includes a sidelink SPS index. If the sidelink SPS operation in the SCell is indicated due to introduction of carrier aggregation, an index indicating the corresponding serving cell may be included. Reference numeral 710 indicates a method of expressing specified sidelink SPS index information and serving cell information by integers of 3 bits, and reference numeral 705 indicates a method of marking a plurality of pieces of SPS index information on a bitmap for each serving cell.

Case 2: New-Typed Integrated Uplink/Sidelink SPS Confirmation MAC CE

Reference numerals 720 and 725 propose the integrated type uplink/sidelink SPS confirmation MAC CE structures. That is, a newly defined common MAC CE is used for uplink/sidelink SPS confirmation MAC CE signaling. Reference numeral 720 is a type obtained by combining reference numerals 701 and 710, and the uplink/sidelink SPS confirmation MAC CE may be transmitted through one signaling. Reference numeral 725 is a type obtained by combining reference numerals 705 and 710. Further, reference numeral 730 is a type obtained by combining reference numerals 701 and 715, and reference numeral 735 is a type obtained by combining reference numerals 705 and 715. In the case of reference numeral 730, there is a small difference in the number and structure of reserved bits, but included information and a method of expressing the information have the same structure as that of case 1.

Case 3: New-Typed Normal Uplink/Sidelink SPS Confirmation MAC CE

In the case of reference number 740, one normal new SPS confirmation MAC CE is used for both the uplink and the sidelink. That is, only configured SPS index information is indicated, which cannot be applied to sidelink SPS for the SCell. The method is possible only when the corresponding function is not configured or not supported.

Figure 8:
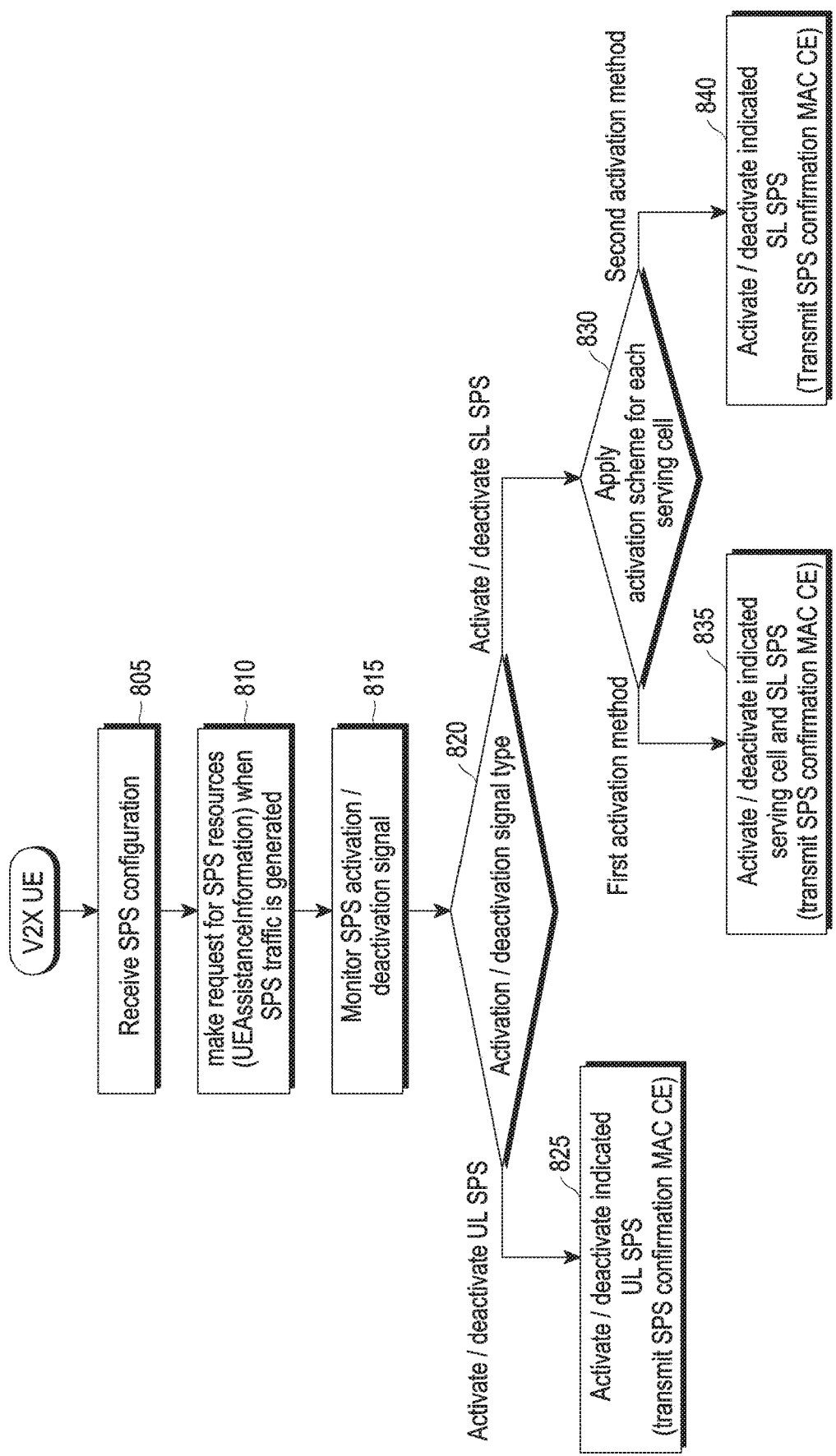
FIG. 8 illustrates the operation of the UE to which the disclosure is applied.

FIG. 8 illustrates the operation of the UE to which the disclosure is applied.

The UE having the RRC connection with the eNB receives the RRC control signal including the SPS configuration from the eNB in step 805. The configuration information may include information effective for (applied to) in common a serving cell (or a plurality of serving cells) in which uplink SPS is configured, and the UE may collect uplink/sidelink SPS information for each specific SPS index.

When V2X data is generated, the UE may make a request for the proper SPS configuration (included in UE assistance information) to the eNB with reference to the configuration in step 810. The UE identifies what SPS activation information is received while monitoring the PDCCH in step 815, and thereafter operates separately in the uplink SPS mode and the sidelink SPS mode according to the type of the activation signal. When the PDCCH received by the UE is transmitted to a UL SPS V-RNTI indicating uplink SPS and uplink SPS activation information (SPS index) is included therein, the UE activates the corresponding uplink SPS and transfers the SPS confirmation MAC CE to the eNB in step 825.

If the PDCCH received by the UE is transmitted to an SL SPS V-RNTI indicating sidelink SPS or according to the existence or non-existence of serving cell activation information, the UE operation is different in steps 835 and 840. In a first activation scheme, when the received PDCCH includes serving cell information and sidelink SPS activation information (SPS index), the UE activates the corresponding sidelink SPS and transfers the SPS confirmation MAC CE to the eNB in step 835. In a second activation scheme, when the received PDCCH includes sidelink SPS activation information (SPS index), the UE activates the corresponding sidelink SPS and transfers the SPS confirmation MAC CE to the eNB in step 840. The first activation scheme is the operation in which SPS for the SCell is performed, and the second activation scheme is the operation in which only SPS for the PCell is performed.

Figure 9:
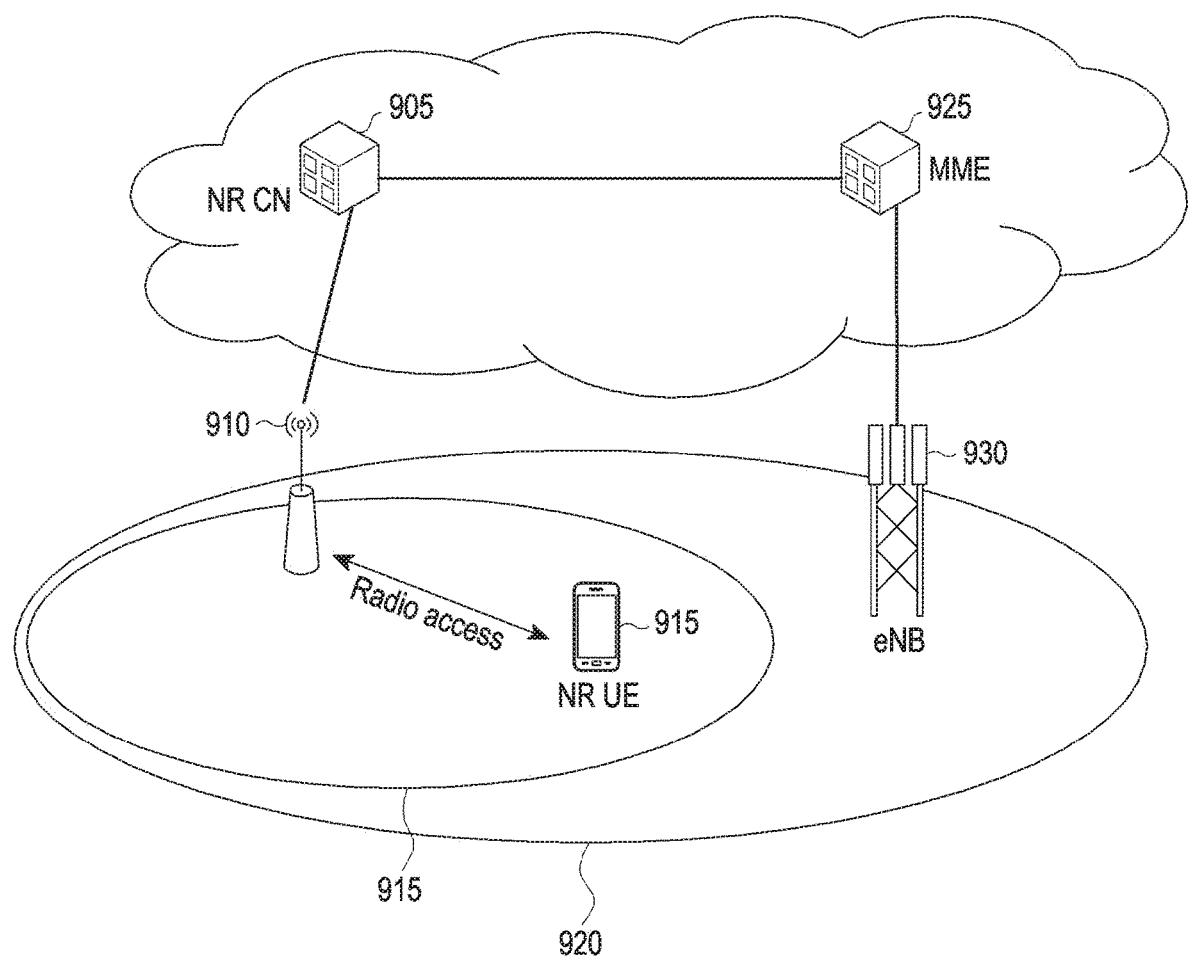
FIG. 9 illustrates the structure of a next-generation mobile communication system to which the disclosure is applied.

FIG. 9 illustrates the structure of a next-generation mobile communication system to which the disclosure is applied.

Referring to FIG. 9, a radio access network of the next-generation mobile communication system may include a next-generation base station 910 (hereinafter, referred to as a New Radio Node B (NR NB) or NR gNB) and a New Radio Core Network (NR CN) 905, and the next-generation mobile communication system may include one some of the elements. A user terminal 915 (hereinafter, referred to as a New Radio User Equipment (NR UE) or a terminal) may access an external network through the NR gNB 910 and the NR CN 905.

In FIG. 9, the NR gNB 910 is an element of the next-generation mobile communication system and corresponds to an evolved Node B (eNB) of the conventional LTE system. The NR gNB 910 may be connected to the NR UE 915 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, which corresponds to the NR gNB 910. One NR gNB 910 may control a plurality of cells. The NR gNB 910 may have a bandwidth wider than the conventional maximum bandwidth in order to implement super-high-speed data transmission compared to conventional LTE and may apply Orthogonal Frequency Division Multiplexing (OFDM) through radio access technology and further apply beamforming technology. Further, the NR gNB 910 may apply a modulation scheme and an Adaptive Modulation and Coding (hereinafter, referred to as an AMC) scheme of determining a channel coding rate in correspondence to a channel status of the UE.

The NR CN 905 performs a function of supporting mobility, configuring a bearer, and configuring a QoS. The NR CN 905 is a device for performing a function of managing mobility of the UE and various control functions and is connected to a plurality of base stations. Further, the next-generation mobile communication system of FIG. 9 may be linked to the conventional LTE system, and the NR CN 905 may be connected to the MME 925 through a network interface. The MME 925 may be connected to the eNB 930, which is a base station of the conventional LTE system.

Figure 10:
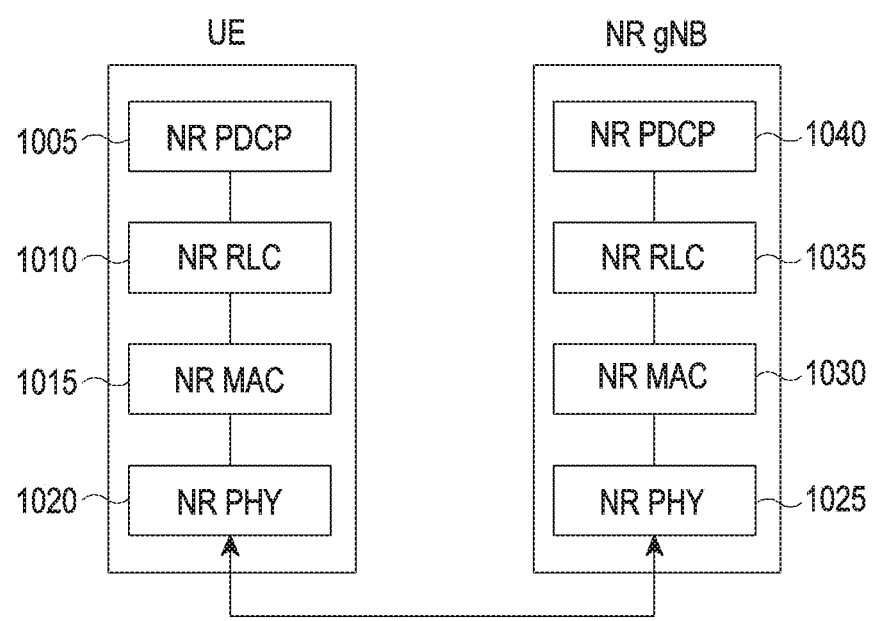
FIG. 10 illustrates a structure of a wireless protocol of the next-generation mobile communication system to which the disclosure can be applied.

FIG. 10 illustrates a structure of a wireless protocol of the next-generation mobile communication system to which the disclosure can be applied.

Referring to FIG. 10, the UE and the NR gNB include NR PDCPs 1005 and 1040, NR RLCs 1010 and 1035, and NR MACs 1015 and 1030, respectively, in the wireless protocol of the next-generation mobile communication system. The main function of the NR PDCPs 1005 and 1040 may include at least one of functions shown in [Table 8] below.

TABLE 8

Header compression and decompression function (Header compression and decompression: ROHC only)
User data transmission function (Transfer of user data)
Sequential delivery function (In-sequence delivery of upper layer PDUs)
Sequence re-arrangement function (PDCP PDU reordering for reception)
Duplicate detection function (Duplicate detection of lower layer SDUs)
Retransmission function (Retransmission of PDCP SDUs)
Ciphering and deciphering function (Ciphering and deciphering)
Timer-based SDU removal function (Timer-based SDU discard in uplink)

The reordering function of the NR PDCP device is a function of sequentially reordering PDCP PDUs received from a lower layer on the basis of a PDCP Sequence Number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main function of the NR RLCs 1010 and 1035 may include at least one of functions shown in [Table 9] below.

TABLE 9

Data transmission function (Transfer of upper layer PDUs)
Sequential delivery function (In-sequence delivery of upper layer PDUs)
Non-sequential delivery function (Out-of-sequence delivery of upper layer PDUs)
ARQ function (Error Correction through ARQ)
Concatenation, segmentation, and reassembly function (Concatenation, segmentation and reassembly of RLC SDUs)
Re-segmentation function (Re-segmentation of RLC data PDUs)
Reordering function (Reordering of RLC data PDUs)
Duplication detection function
Error detection function (Protocol error detection)
RLC SDU deletion function (RLC SDU discard)
RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1015 and 1030 may be connected to various NR RLC layer devices included in one UE, and the main function of the NR MACs may include at least one of functions shown in [Table 10] below.

TABLE 10

Mapping function (Mapping between logical channels and transport channels)
Multiplexing and demultiplexing function (Multiplexing/demultiplexing of MAC SDUs)
Scheduling information report function (Scheduling information reporting)
HARQ function (Error correction through HARQ)
Logical channel priority control function (Priority handling between logical channels of one UE)
UE priority control function (Priority handling between UEs by means of dynamic scheduling)
MBMS service identification function (MBMS service identification)
Transport format selection function (Transport format selection)
Padding function (Padding)

The PHY layers 1020 and 1025 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 11:
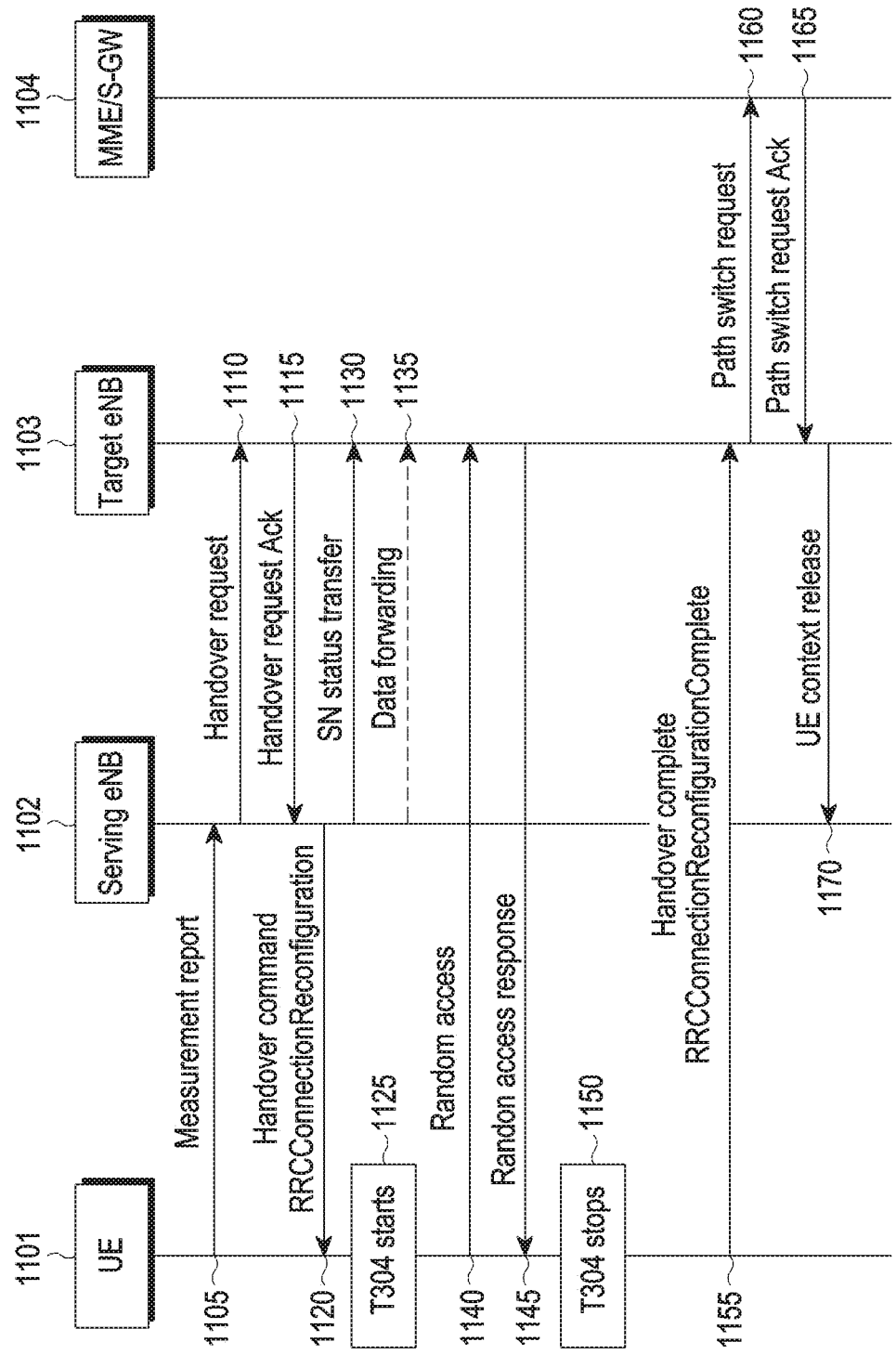
FIG. 11 illustrates a handover operation in an LTE system.

FIG. 11 illustrates a handover operation in the LTE system.

A UE 1101 in a connected-mode state reports cell measurement information (measurement report) to a current serving eNB 1102 periodically or when a specific event is satisfied. The serving eNB 1102 determines whether to hand over the UE 1101 to an adjacent cell on the basis of the measurement information. The handover is technology for switching a serving eNB, which provides a service to the UE in the connected-mode state, to another eNB. When the serving cell determines the handover, the serving cell 1102 transmits a handover (HO) request message to a new eNB, that is, a target eNB 1103 that will provide service to the UE 1101 to make a request for the handover in step 1110. When the target cell 1103 accepts the handover request, the target cell transmits an HO request Ack message to the serving cell 1102 in step 1115. The serving cell 1102 receiving the message transmits an HO command message to the UE 1101 in step 1120. Before receiving the HO command, the UE 1101 transmits an uplink channel PUSCH/PUCCH while continuously receiving a downlink channel PDCCH/PDSCH/PHICH from the serving cell 1102. The HO command message is transmitted by the serving cell 1102 to the UE 1101 through an RRC connection reconfiguration message in step 1120. Upon receiving the message, the UE 1101 stops transmitting and receiving data to and from the serving cell 1102 and starts a timer T304. When the UE 1101 does not succeed in the handover to the target cell 1103 for a predetermined time, T304 returns back the UE 1101 to the original setting and switches to an RRC-idle state. The serving cell 1102 transmits a Sequence Number (SN) status for uplink/downlink data, and if there is downlink data, transmits the downlink data to the target cell 1103 in steps 1130 and 1135.

The UE 1101 attempts random access to the target cell 1103 indicated by the serving cell 1102 in step 1140. The random access is to inform the target cell 1103 that the UE 1101 moves through the handover and also to synchronize uplink. For the random access, the UE 1101 transmits a preamble corresponding to a preamble ID provided from the serving cell 1102 or randomly selected to the target cell 1103. After transmitting the preamble, the UE 1101 monitors whether a Random Access Response (RAR) is transmitted from the target cell 1103 after a predetermined number of subframes. A time window during which monitoring is performed is referred to as a Random Access Response (RAR) window. When the RAR is received during the specific time in step 1145, the UE 1101 carries an HO complete message on an RRC connection reconfiguration complete message and transmits the same to the target cell 1103 in step 1155. Thereafter, the UE 1101 transmits an uplink channel PUSCH/PUCCH while continuously receiving a downlink channel PDCCH/PDSCH/PHICH from the target cell 1103. As described above, upon successfully receiving the RAR from the target cell 1103, the UE 1101 terminates the timer T304 in step 1150.

The target cell 1103 may make a request for modifying a path in order to change a path of bearers configured to the serving cell 1102 in steps 1160 and 1165, and instruct the serving cell 1102 to delete UE context of the UE 1101 in step 1170. Accordingly, the UE 1101 attempts data reception at a start time point of the RAR window for the target cell 1103 and, after RAR reception, starts transmission to the target cell 1103 while transmitting an RRC connection reconfiguration complete message.

Figure 12:
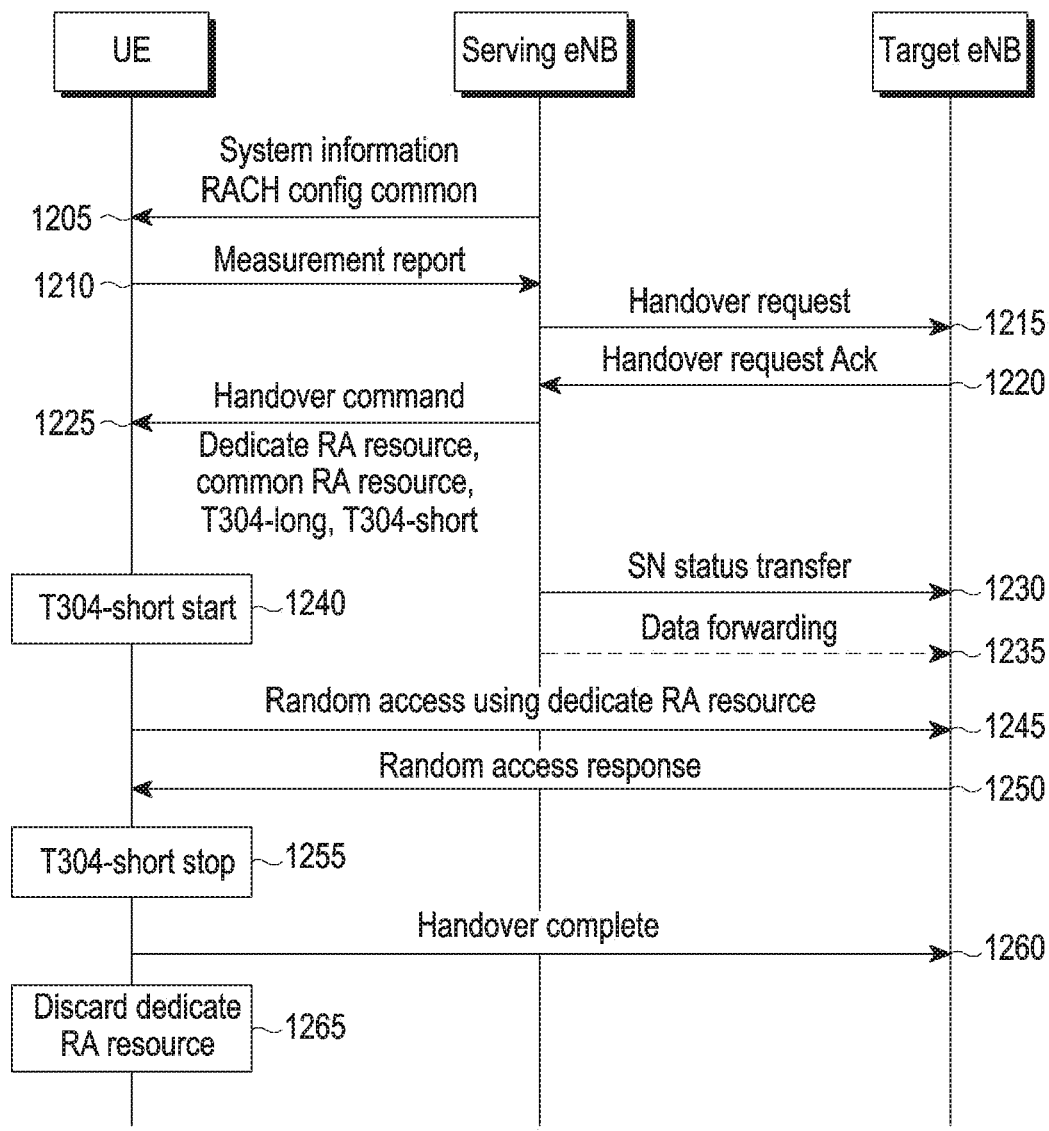
FIG. 12 illustrates the overall operation when a handover through dedicated random access resources is successful according to an embodiment of the disclosure.

FIG. 12 illustrates the overall operation of successful handover (HO) through dedicated random access resources (for example, dedicated RACH) according to an embodiment of the disclosure.

The UE receives system information from the serving eNB and collects information for the future service in step 1205. Particularly, the corresponding information includes default information required for random access. For reference, a method of using dedicated random access resources for the handover is proposed by the following drawing (that is, FIG. 12).

The UE in the radio Resource Control (RRC)-connected state reports cell measurement information (measurement report) to the current serving eNB periodically or when a specific event is satisfied in step 1210. The serving eNB determines whether the UE performs the handover to an adjacent cell on the basis of the measurement information. The handover is technology for switching a serving cell, which provides a service to the UE in the connected-mode state, to another eNB. When the serving cell determines the handover, the serving cell makes a request for the handover by transmitting a handover (HO) request message to a new eNB, that is, a target eNB that will provide service to the UE in step 1215. When the target cell accepts the handover request, the target cell transmits a handover (HO) request Ack message to the serving cell in step 1220.

The serving cell receiving the message transmits a handover (HO) command message to the UE in step 1225. Before receiving the HO command, the UE transmits an uplink channel PUSCH/PUCCH while continuously receiving a downlink channel PDCCH/PDSCH/PHICH from the serving cell. The handover (HO) command message is transferred by the serving cell to the UE through an RRC connection reconfiguration message in step 1225. If the RRC message includes both dedicated random access resources and common random access resources, the UE determines which resources are used to perform random access to the target cell and operates according thereto. The dedicated random access resources may be a dedicated Random Access Channel (RACH) or a contention-free RACH, and the common random access resources may be a common RACH or a contention RACH. Further, the RRC message may include T304-*short* for dedicated random access and T304-*long* for common random access. Although only one timer (T304) operates when the handover starts and the corresponding timer stops if the handover is successfully completed in LTE, the beam-based handover is performed in NR, and thus dedicated random access resources may be dedicated RACH resources associated with a specific downlink beam. The dedicated random access resources may have a structure in which resources are indicated through a connection with a preamble index. That is, basically, the dedicated random access resources are resources related to time/frequency/sequence. Similarly, the common random access resources may be common RACH resources related to a specific downlink beam. The dedicated random access resources may be resources related to an SS block or a CSI-RS. That is, the dedicated random access resources may be transmitted through a specific beam in a specific frame or slot in which the SS block or the CSI-RS is transmitted. Since dedicated random access is configured for a specific UE and through a beam having a specific directivity, it takes a shorter time to transmit a random access preamble and a Random Access Response (RAR) than common random access. Accordingly, the timer for dedicated random access may be configured to have a value (T304-*short*) smaller than the timer T304-*long* for common random access.

Upon receiving the handover command message, the UE stops transmitting and receiving data to and from the serving cell and starts the timer T304-*short* in step 1240. When the UE does not succeed in the handover to the target cell for a predetermined time, T304-*short* returns the UE to the original configuration and switches the UE to the RRC-idle state. The serving cell transmits a Sequence Number (SN) status for uplink/downlink data, and if there is downlink data, transmits the downlink data to the target cell in steps 1230 and 1235.

The UE attempts random access to the target cell indicated by the serving cell in step 1245. The random access is to inform the target cell that the UE moves through the handover and also to synchronize uplink. When both the dedicated random access resources and the common random access resources are configured, the UE may determine which random access resources are used to perform random access to the target cell. For example, the UE may receive a handover command including configuration information indicating dedicated random access resources and common random access resources from the eNB of the serving cell. In a first method, when both the random access resources are configured, the UE always performs random access preferentially using dedicated random access resources and, if the random access through the corresponding resources fails, uses common random access resources. In a second method, the eNB explicitly designates which random access resources are used. In a third method, one of the two resources is selected according to UE implementation.

In an embodiment implemented with reference to the present drawing, that is, FIG. 12, the dedicated random access resources are selected. For the random access, the UE transmits a preamble through the dedicated random access resources received from the serving cell (or transmits a preamble to the target cell through resources corresponding to a dedicated preamble ID). After transmitting the preamble, the UE monitors whether a random access response message is transmitted from the target cell after a specific number of subframes. A time window during which monitoring is performed is referred to as a Random Access Response (RAR) window.

When the RAR is received for a specific time in step 1250, the UE carries a handover (HO) complete message on an RRC reconfiguration complete message to transmit the same to the target cell in step 1260. Thereafter, the UE transmits an uplink channel PUSCH/PUCCH while continuously receiving a downlink channel PDCCH/PDSCH/PHICH from the target cell. As described above, upon successfully receiving the RAR from the target cell, the UE terminates the timer T304-*short* in step 1255. The target cell makes a request for modifying a path in order to change a path of bearers configured to the serving cell and instructs the serving cell to delete UE context of the UE. Further, the UE discards the dedicated random access resources because the dedicated random access resources are not used any more. Accordingly, the UE attempts data reception from the UE at a RAR window start time point for the target cell, and after RAR reception, starts data transmission to the target cell while transmitting an RRC connection reconfiguration complete message.

Figure 13:
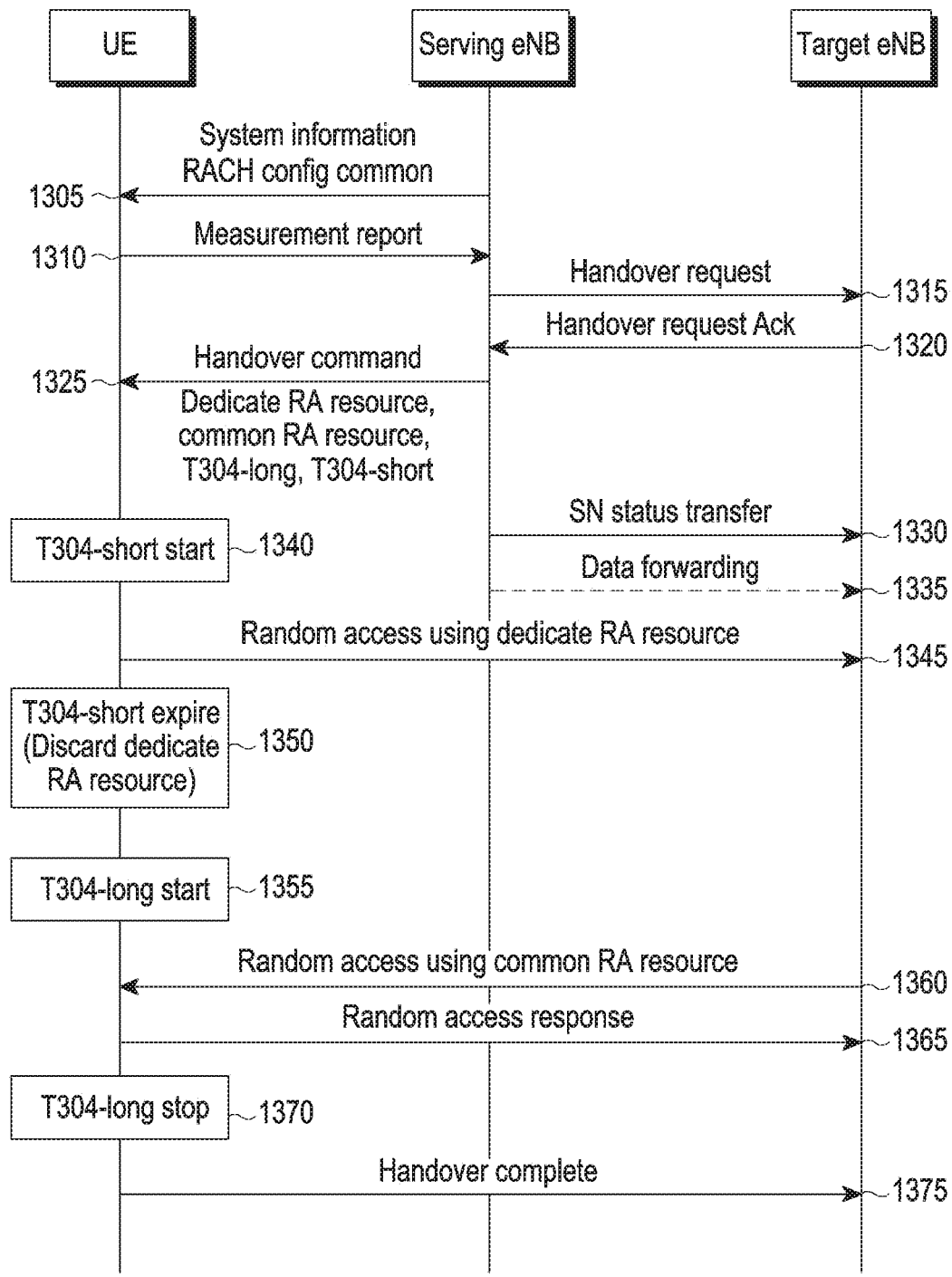
FIG. 13 illustrates the overall operation when the handover through dedicated random access resources fails according to another embodiment of the disclosure.

FIG. 13 illustrates the overall operation when the handover through dedicated random access resources fails according to another embodiment of the disclosure.

The UE receives system information from the serving eNB and collects information for the future service in step 1305. Particularly, the corresponding information includes default information required for random access. For reference, a method of using dedicated random access resources for the handover is proposed by the following drawing (that is, FIG. 13).

The UE in the radio Resource Control (RRC)-connected state reports cell measurement information (measurement report) to the current serving cell periodically or when a specific event is satisfied in step 1310. The serving eNB determines whether to perform the handover of the UE to an adjacent cell on the basis of the measurement information. The handover is technology for switching a serving eNB, which provides a service to the UE in the connected-mode state, to another eNB. When the serving cell determines the handover, the serving cell makes a request for the handover by transmitting a Handover (HO) request message to a new eNB, that is, a target eNB that will provide service to the UE in step 1315. When the target cell accepts the handover request, the target cell transmits a handover (HO) request Ack message to the serving cell in step 1320. The serving cell receiving the message transmits a HO command message to the UE in step 1325. Before receiving the HO command, the UE transmits an uplink channel PUSCH/PUCCH while continuously receiving a downlink channel PDCCH/PDSCH/PHICH from the serving cell.

The HO command message is transferred by the serving cell to the UE through an RRC connection reconfiguration message in step 1325. If the RRC message includes both dedicated random access resources and common random access resources, the UE determines which resources are used to perform random access to the target cell and operates according thereto. Further, the RRC message may include T304-*short* for dedicated random access and T304-*long* for common random access. Although only one timer (T304) operates when the handover starts and the corresponding timer stops if the handover is successfully completed in LTE, the beam-based handover is performed in NR, and thus dedicated random access resources may be dedicated RACH resources associated with a specific downlink beam. The dedicated random access resources may have a structure in which resources are indicated through a connection with a preamble index. That is, basically, the dedicated random access resources are resources related to time/frequency/sequence. Similarly, the common random access resources may be common RACH resources related to a specific downlink beam. The dedicated random access resources may be resources related to an SS block or a CSI-RS. That is, the dedicated random access resources may be transmitted through a specific beam in a specific frame or slot in which the SS block or the CSI-RS is transmitted. Since dedicated random access is configured for a specific UE and through a beam having a specific directivity, it takes a shorter time to transmit a random access preamble and a Random Access Response (RAR) than common random access. Accordingly, the timer for dedicated random access may be configured to have a value (T304-*short*) smaller than the timer T304-*long* for common random access.

Upon receiving the handover command message, the UE stops transmitting and receiving data to and from the serving cell and starts the timer T304-*short* in step 1340. When the UE does not succeed in the handover to the target cell for a predetermined time, T304-*short* returns the UE to the original configuration and switches the UE to the RRC-idle state. The serving cell transmits a Sequence Number (SN) status for uplink/downlink data to the target cell and if there is downlink data, transmits the downlink data to the target cell in steps 1330 and 1335. The UE attempts random access to the target cell indicated by the serving cell in step 1345. The random access is to inform the target cell that the UE moves through the handover and also to synchronize uplink.

When both the dedicated random access resources and the common random access resources are configured, the UE may determine which random access resources are used to perform random access to the target cell. In a first method, when both the random access resources are configured, the UE always performs random access preferentially using dedicated random access resources and, if the random access through the corresponding resources fails, uses common random access resources. In a second method, the eNB explicitly designates which random access resources are used. In a third method, one of the two resources is selected according to UE implementation.

In an embodiment described with reference to the present drawing, that is, FIG. 13, the dedicated random access resources are first selected, and then the common random access resources are selected. For the random access, the UE transmits a preamble through the dedicated random access resources received from the serving cell (or transmits a preamble to the target cell through resources corresponding to a dedicated preamble ID). After transmitting the preamble, the UE monitors whether a random access response message is transmitted from the target cell after a specific number of subframes. A time window during which monitoring is performed is referred to as a Random Access Response (RAR) window. When the RAR is not received for the specific time (that is, the timer T304-*short* expires), the UE discards the dedicated random access resources and transfers a preamble through the common random access resources in step 1360. During the process, the UE starts the timer T304-*long*. Thereafter, the UE monitors whether a random access response message is transmitted from the target cell. When the RAR is received for the specific time in step 1365, the UE transmits an uplink channel PUSCH/PUCCH while continuously receiving a downlink channel PDCCH/PDSCH/PHICH from the target cell. When the random access response is successfully received from the target cell as described above, the UE ends the timer T304-*long* in step 1370 and transfers a handover complete message to the eNB in step 1375. The target cell makes a request for modifying a path in order to change a path of bearers configured to the serving cell and instructs the serving cell to delete UE context of the UE.

Figure 14:
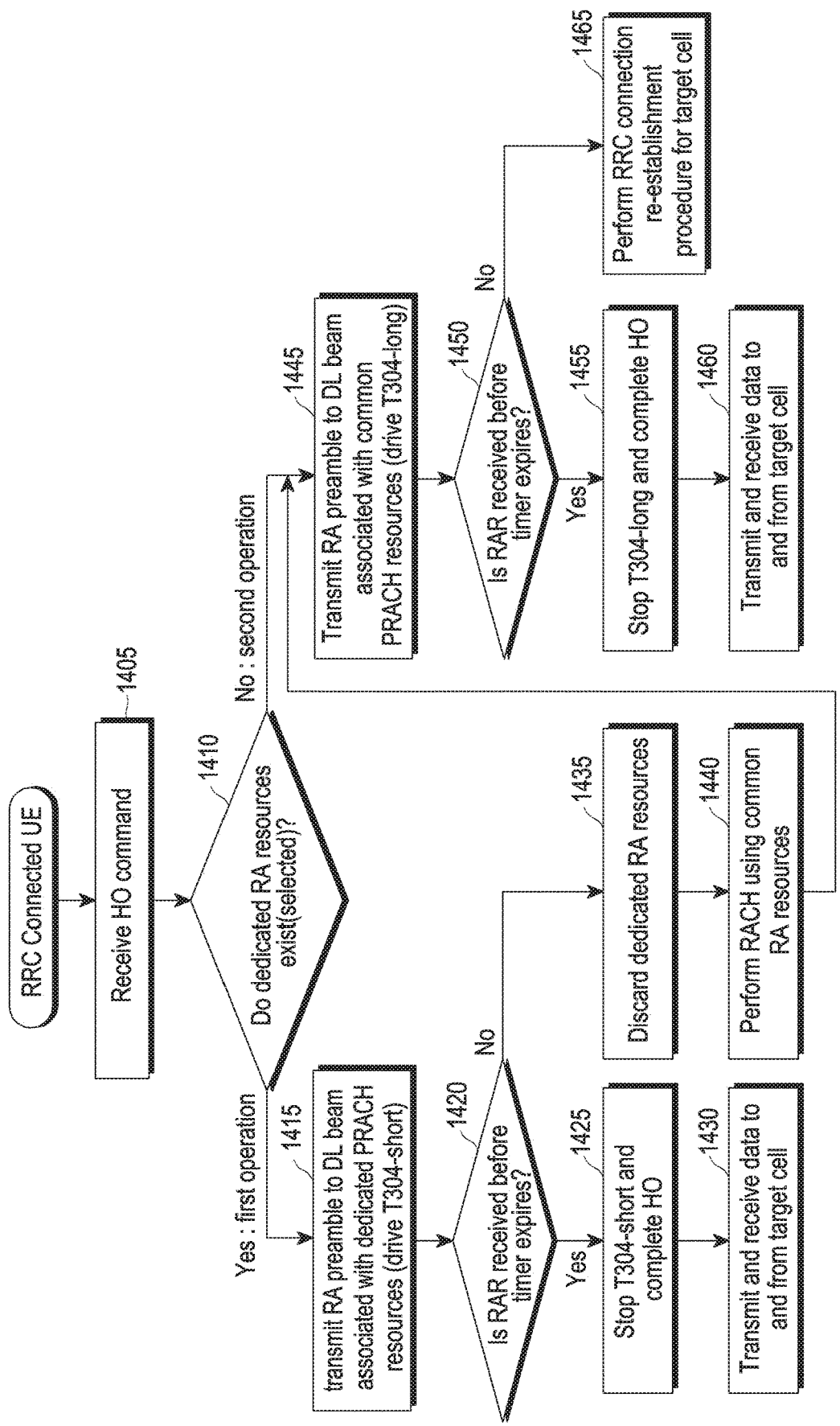
FIG. 14 illustrates the overall operation of the UE to which the disclosure is applied.

FIG. 14 illustrates the overall operation of the UE to which the disclosure is applied.

In step 1405, the UE in the RRC-connected state receives a handover command message from the eNB. The HO command message may include dedicated random access resources, common random access resources, T304-*short* for dedicated random access, and T304-*long* for common random access. In step 1410, the UE performs a first operation when the received message includes dedicated random access resources or indicates the use of dedicated random access resources, or performs a second operation when the message does include dedicated random access resources or indicates the non-use thereof.

In the first method, when both the random access resources are configured, the UE always performs random access preferentially using dedicated random access resources and, if the random access through the corresponding resources fails, the UE uses common random access resources.

In step 1415, the UE first transmits a random access preamble through dedicated random access resources (time/frequency/sequence) associated with a downlink beam. In the above step, the UE transmits the preamble and operates the timer T304-*short* at the same time. When the UE receives the RAR signal before the timer expires in step 1420, the UE stops the timer and transfers a handover complete signal indicating that the handover to the target cell is successfully completed to the target eNB in step 1425. In step 1430, the UE transmits and receives data to and from the target cell. If the timer expires, the UE discards the used dedicated random access resources in step 1435. In step 1440, the UE performs random access using common random access resources.

The second operation is an operation for performing random access using common random access resources. In the second operation, only common random access resources are configured or both the dedicated random access resources and the common random access resources are configured but only the dedicated random access resources are first used to perform random access and, if the random access fails, the common random access resources are used.

In step 1445, the UE first transmits a random access preamble through common random access resources (time/frequency/sequence) associated with a downlink beam. In the above step, the UE transmits the preamble and operates the timer T304-*long* at the same time. When the UE receives the RAR before the timer expires in step 1450, the UE stops the timer and transfers a handover complete signal indicating that the handover to the target cell is successfully completed to the target eNB in step 1455. In step 1460, the UE transmits and receives data to and from the target cell. When the timer expires, the UE returns the configuration of the UE to the original configuration and switches to the RRC-idle state. In step 1465, the UE performs an RRC connection reconfiguration procedure.

Figure 15:
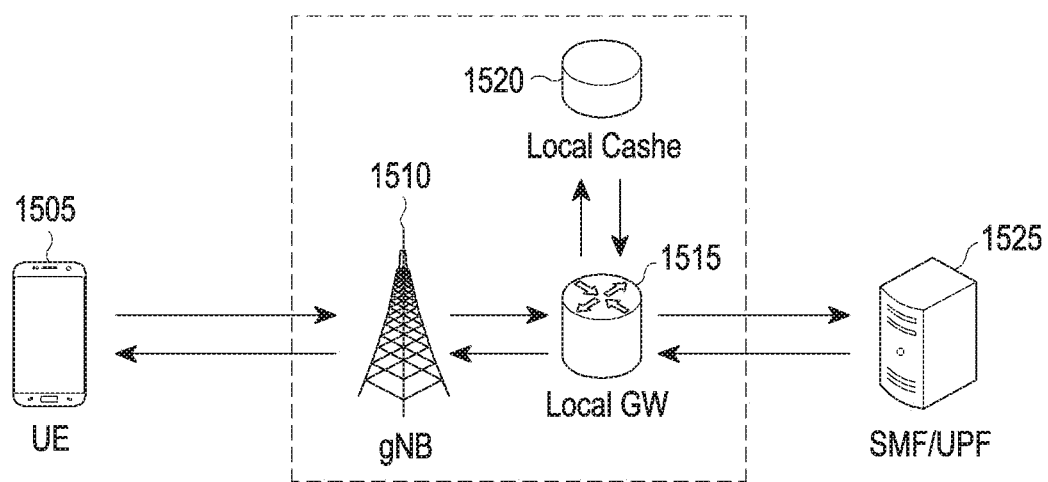
FIG. 15 illustrates a local cache structure of the next-generation mobile communication system to which the disclosure can be applied.

FIG. 15 illustrates a local cache structure of the next-generation mobile communication system to which the disclosure can be applied.

A data delay time increase due to a long backhaul delay in the LTE system and the next-generation mobile communication system is one of the issues that should be solved in the network structure. In order to solve this problem, local cache has been introduced, and frequently used data packets may be stored in a storage space around the eNB and used with a small delay when eNB-related traffic is generated. For the local cache, it is checked whether the corresponding data packet is a packet that should be stored in the local cache for each content. If there is no special rule, the eNB determines the existence of the local cache through a Deep Packet Inspection (DPI) operation. The cache is a temporary storage space for storing data in case of a future request in order to facilitate fast data access. Further, the DPI is a technology for inspecting and analyzing actual content of the packet and may inspect even a starting point, a destination, and content of the data, which requires high operation throughput.

The disclosure proposes a method by which the UE helps the eNB in performing the local cache in order to reduce an increase in an operation amount due to the DPI for all data packets by the eNB. First, the present drawing (FIG. 15) illustrates the structure of the local cache in the next-generation mobile communication system. Basically, a UE 1505 receives an IP packet generated for each service through a corresponding User Plane Function (UPF) 1525. The data is transmitted to the UE via a gNB 1510, and if the gNB is a gNB including a local cache function, a local GW 1515 and a local cache 1520 may exist as independent spaces within the gNB or near the gNB. In general, the local cache may reduce a delay as being closer to the gNB and thus may be more efficient. The disclosure considers the next-generation mobile communication system including the above-described local cache. The model can be directly applied to the LTE system in which case a Session Management Function (SMF)/UPF may be replaced with a PGW/SGW.

FIG. 16 illustrates the structure of a data packet in which the local cache is performed with help from the UE proposed by the disclosure.

The UE may decode a data packet received from the gNB and detect which source the corresponding data packet is from and which service belongs to the data. This may be informed through a source IP address included in the IP packet and a Data Radio Bearer (DRB) through which the corresponding data is received. That is, the UE may know whether specific traffic (service) or a data packet is needed for the local cache according to a preset condition (according to UE implementation or NAS) and indicate that the corresponding data packet corresponds to data requiring the local cache to the gNB by in-band marking the corresponding data packet. For example, the data packet may be selected from among an emergency message, a high capacity video packet that may be repeated, and frequently transmitted user plane data according to implementation.

A request for the data requiring the local cache has ambiguity in definition thereof for each Data Radio Bearer (DRB) and also the need to define each DRB is doubtful. Accordingly, the easiest and simplest approach proposed by the disclosure is to apply the local cache to all DRBs. That is, whether to apply the local cache to data packets of all DRBs having a valid PDCP SN value is indicated using "A" bits for the reserved bit "R".

However, in order to apply the method, the conventional PDCP data packet needs an extra reserved bit, so that the local cache cannot be applied all cases. Whether to apply the local cache to the case shown in [Table 11] is indicated using a 1-bit indicator (assistance bit).

TABLE 11

| | |
|---|---|
| LTE | Local cache cannot be applied to PDCP data packet having 7/15-bit PDCP SN (1605 and 1610), and local cache can be applied to PDCP data packet having 12/18-bit PDCP SN (1615 and 1620) |
| NR | Local cache can be applied to PDCP data packet having 12/18-bit PDCP SN (1625 and 1630) |

The 1 bit of the conventional reserved bit "R" is replaced with the assistance bit "A". The bit "A" indicates whether the gNB/eNB is required to perform DPI for the local cache on the corresponding marked data packet. That is, the gNB decodes whether the bit "A" is marked on the data packet having the 12/18-bit SN transmitted by the UE and, if the bit "A" is checked, performs DPI on the corresponding data packet, detects which traffic corresponds to the corresponding packet, and stores the packet in the local cache. If corresponding traffic (service) is needed to be transmitted in downlink, the gNB may directly transmit the data packet stored in the local cache to the UE so as to reduce a backhaul delay instead of receiving the corresponding data from the core network and transmitting the data to the UE.

Figure 17:
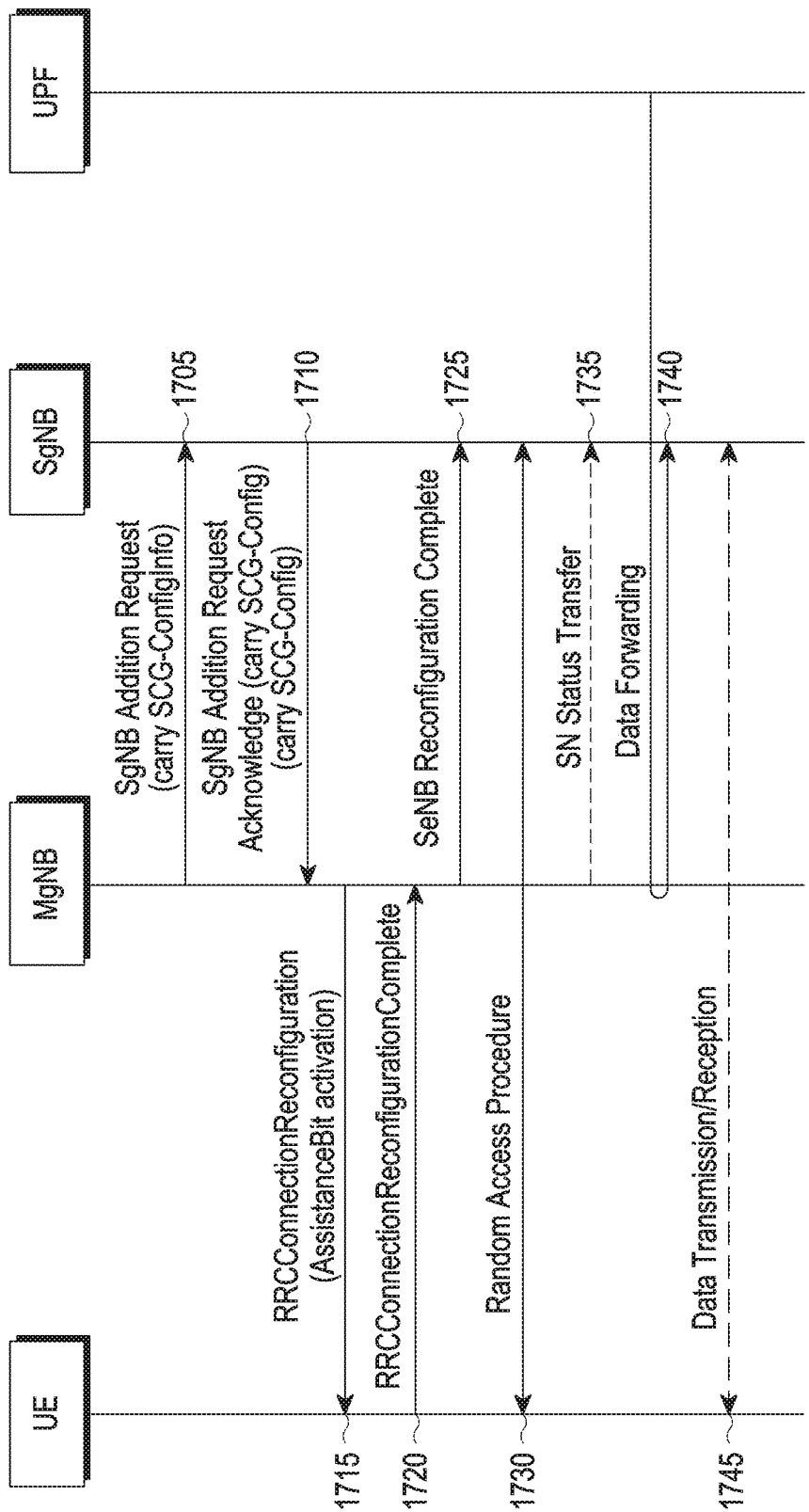
FIG. 17 illustrates a local cache operation of the UE supporting multiple accesses according to an embodiment of the disclosure.

FIG. 17 illustrates a local cache operation of the UE supporting multiple accesses according to an embodiment of the disclosure.

In the present embodiment, how to apply the local cache operation supported by the UE to Dual Connectivity (DC) is described. A Master gNB (MgNB) transfers an SgNB an SgNB addition/modification request message to a Secondary gNB (SgNB) in step 1705. The message includes configuration information for a Secondary Cell Group (SCG). Particularly, the message can be transmitted only when the UE supports DC, and the message may include information on whether the local cache is configured, and configuration information of a Data Radio Bearer (DRB) and a Signaling Radio Bearer (SRB) of an SCG.

The SgNB transfers an SgNB addition/modification request response message in response to the request from the MgNB in step 1710. The message includes configuration information for the SCG. Particularly, the message may include an indicator that informs of whether the local cache is applied. Basically, the local cache may be applied to all DRBs, and whether to apply the local cache may be indicated for each of specific DRBs.

The MgNB transfers SgNB configuration information received from the SgNB to the UE in step 1715. That is, the RRC connection reconfiguration message implies a method of applying the local cache in the DC. For example, the MgNB may indicate at least one of the configurations shown in [Table 12] below.

TABLE 12

1. Apply assistance bit only to MCG/MCG split (apply local cache)
2. Apply assistance bit only to SCG/SCG slit (apply local cache)
3. Apply assistance bit to all of MCG/MCG split and SCG/SCG split (apply local cache)
4. Do not apply assistance bit to all of MCG/MCG split and SCG/SCG split (do not apply local cache)

The UE performs assistance bit marking of the bit "A" of the PDCP for the local cache on an uplink data packet according to information corresponding to the indicator indicating the content. The UE transfers an RRC message including an indicator confirming whether the assistance bit is applied again to the MgNB in step 1720, and the MgNB transfers the corresponding information to the SgNB in step 1725.

The UE performs a random access procedure for the configured SgNB in step 1730, and when the MgNB transfers the SN status to the SgNB in step 1735, the MgNB forwards data from the UPF to the SgNB in step 1740. When the DC configuration is completed, the UE and the SgNB can transmit and receive data in the DC-connected mode in step 1745, and the UE may perform local assistance through assistance bit marking according to a local cache type configured in the uplink data packet.

Figure 18:
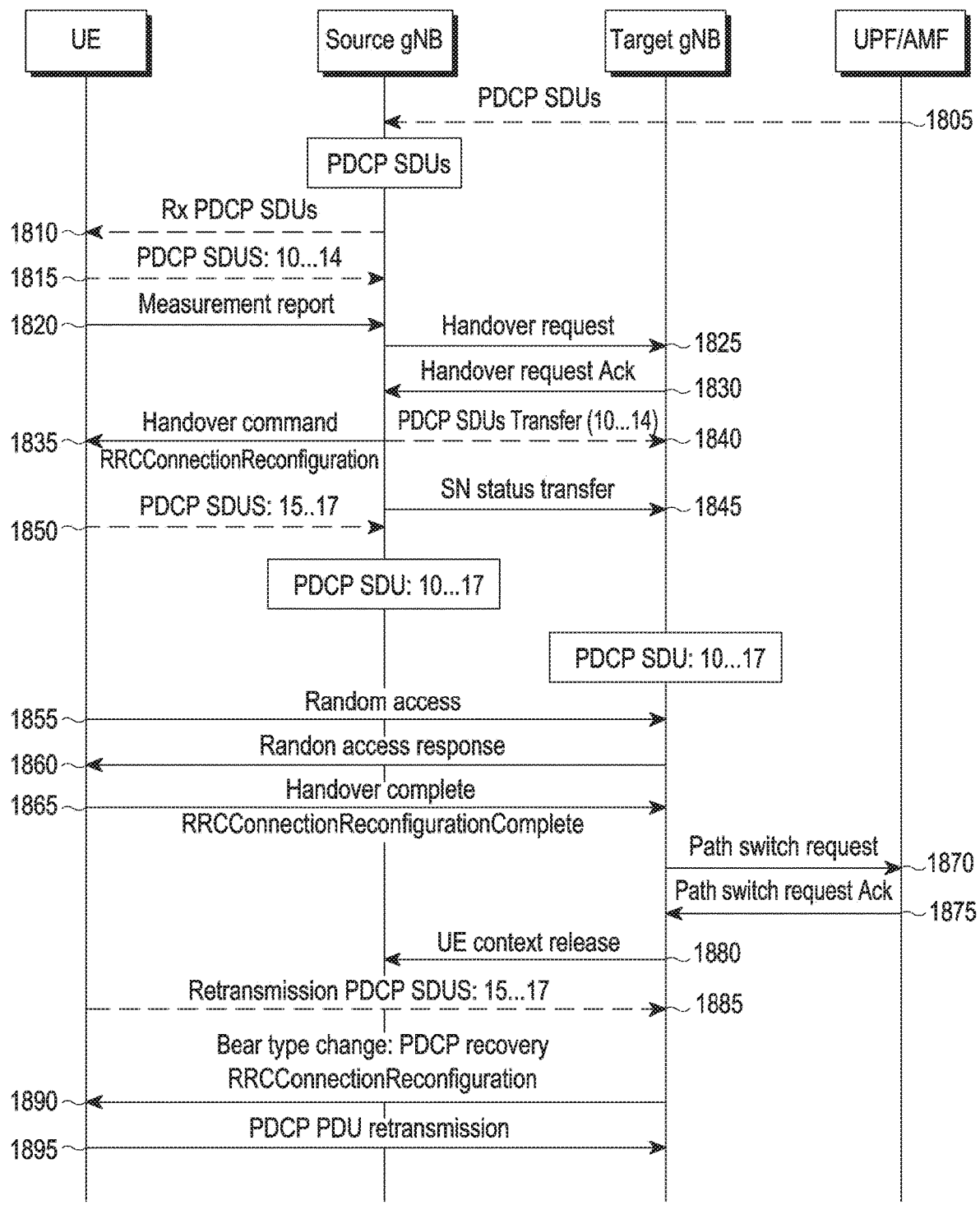
FIG. 18 illustrates a local cache operation of the UE when retransmission is performed according to an embodiment of the disclosure.

FIG. 18 illustrates a local cache operation of the UE when retransmission is performed according to an embodiment of the disclosure.

A serving cell receives downlink PDCP SDUs from the UPF in step 1805. The serving cell transfers the corresponding PDCP SDUs to the UE in step 1810, and the UE transfers PDCP SDUs to the serving cell in step 1815. The UE in the connected-state mode reports cell measurement information (measurement report) to the current serving cell periodically or when a specific event is satisfied in step 1820. The serving cell determines whether the UE performs the handover to an adjacent cell on the basis of the measurement information. The handover is technology for switching a serving cell, which provides a service to the UE in the connected-mode state, to another gNB. When the serving cell determines the handover, the serving cell makes a request for the handover by transmitting a Handover (HO) request message to a new gNB, that is, a target gNB that will provide service to the UE in step 1825. When the target cell accepts the handover request, the target cell transmits a handover (HO) request Ack message to the serving cell in step 1830. Messages exchanged between the gNBs in steps 1825 and 1830 may include information on whether the local cache is applied and information on acceptance. That is, an operation in which the UE marks the data packet (more particularly, performs marking of the bit "A" of the PDCP PDU in local cache applying data) after completing the handover is indicated.

The serving cell receiving the message transmits a HO command message to the UE in step 1835. The HO command message may be transmitted by the serving cell to the UE through an RRC connection reconfiguration message, and the message may include an indicator indicating whether the UE applies the local cache. That is, whether to apply the assistance bit may be signaled to the target cell. When the handover operation is triggered, the serving cell transfers data (PDCP SDU having SNs 10 to 14) stored in a buffer to the target cell in step 1840. Further, the serving cell transfers a Sequence Number (SN) status uplink/downlink data to the target cell. That is, the serving cell transfers information indicating that the PDCP SN that is expected to be received by the target cell is 15 in step 1845. Since the UE operates in a seamless handover state, the UE may maintain the connected-state and the serving cell may continuously transfer the SDU to the UE.

The serving cell transfers PDCP SDUs having SNs 15, . . . , 17 to the UE in step 1850. At this time, the SN of the additionally transmitted PDCP SDU is not transmitted to the target cell. Even though the serving cell receives all of the PDCP SDUs that the UE transmitted, the serving cell does not transmit RLC ACK of the data received during the HO procedure with the target cell, and the UE retransmits data packets of which RLC ACK has not been received after the connection with the target cell.

The UE attempts random access to the target cell instructed by the serving cell in step 1855. The random access is to inform the target cell that the UE moves through the handover and also to synchronize uplink. For the random access, the UE transmits a preamble corresponding to a preamble ID received from the serving cell or randomly selected to the target cell. After transmitting the preamble, the UE monitors whether a Random Access Response (RAR) is transmitted from the target cell after a predetermined number of subframes. A time window during which monitoring is performed is referred to as a Random Access Response (RAR) window.

When the RAR is received for a specific time in step 1860, the UE carries a handover (HO) complete message on an RRC reconfiguration complete message to transmit the same to the target cell in step 1865. Similarly, the HO complete message may include an indicator for identifying whether the UE applies the local cache. Thereafter, the UE transmits an uplink channel PUSCH/PUCCH while continuously receiving a downlink channel PDCCH/PDSCH/PHICH from the target cell.

The target cell makes a request for modifying a path in order to change a path of bearers configured to the serving cell in steps 1870 and 1875, and instructs the serving cell to delete UE context of the UE in step 1880. Accordingly, the UE attempts data reception from the target cell at a RAR window start time point for the target cell, and after RAR reception, starts data transmission to the target cell while transmitting an RRC connection reconfiguration complete message. That is, retransmission of PDCP SDUs 15, . . . , 17 is also included in step 1895. When the serving cell determines to apply the local cache to the retransmitted PDCP SDU due to the PDCP re-establish operation by the handover, the target cell also applies the local cache to the retransmitted PDCP SDU. That is, the PDCP PDU including the retransmitted SDU is transmitted with marking of the assistance bit.

If the gNB changes the bearer configuration, the UE performs a PDCP recovery operation on the PDCP PDU transmitted through the corresponding bearer in step 1890. In the above case, for the corresponding changed bearer, the UE retransmits the PDCP PDU. If the local cache can be applied to (configured in) the changed bearer of the corresponding target cell, the UE marks the assistance bit on the packet corresponding to PDCP PDU retransmission and transmits the same. However, if the local cache cannot be applied to (is not configured in) the changed bearer of the corresponding target cell, the UE performs transmission without marking the assistance bit on the packet corresponding to PDCP PDU retransmission.

Figure 19:
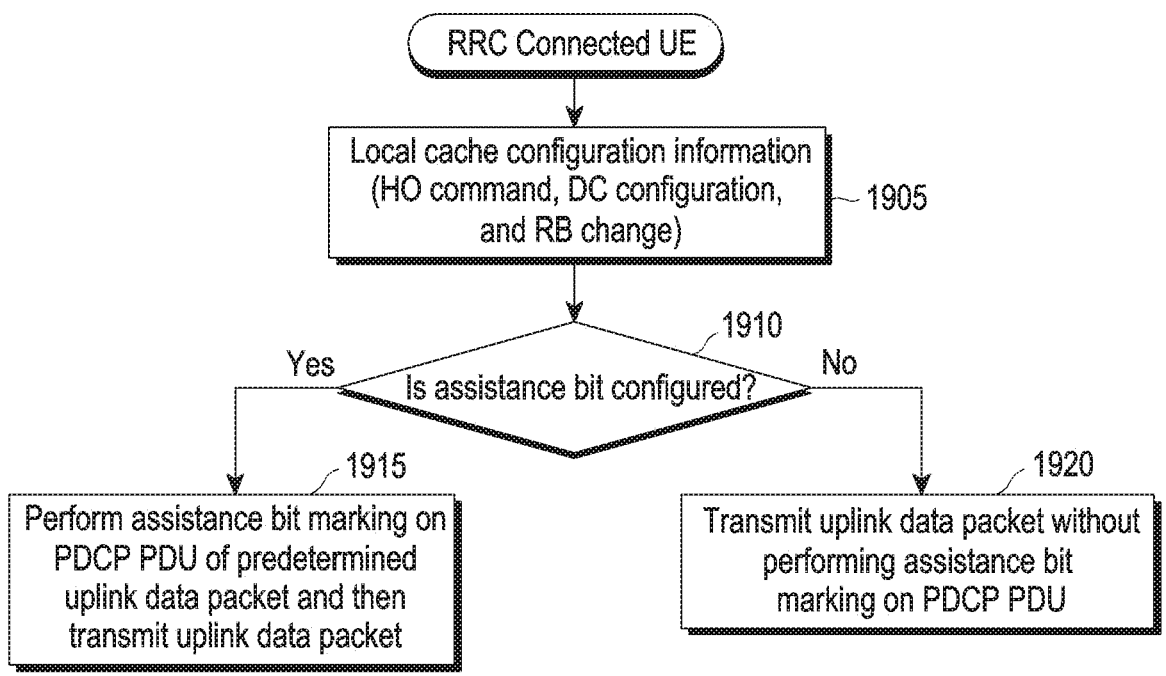
FIG. 19 illustrates the overall operation of the UE to which the disclosure is applied.

FIG. 19 illustrates the overall operation of the UE to which the disclosure is applied.

The UE in the connected state may receive local cache configuration information from the base station in various conditions in step 1905. Basically, the configuration is received through an RRC connection reconfiguration message, and whether to perform marking of the assistance bit for assisting the local cache by the target cell, the target node, or the changed RB is indicated after reception of the message by inserting the configuration in an IE indicating the HO command, the DC configuration, or the RB change in step 1910. Data traffic information for performing assistance bit marking may be received through a NAS message or defined according to UE implementation. When the configuration is indicated, the UE inspects whether there is predetermined traffic for all DRBs applied after the configuration, marks the bit "A" of the corresponding PDCP PDU on traffic requiring the local cache, and transfers the traffic to the base station in step 1915.

When there is no corresponding configuration, the UE transfers the data packet to the eNB without performing assistance bit marking on the PDCP PDU of the uplink data packet in step 1920.

Figure 20:
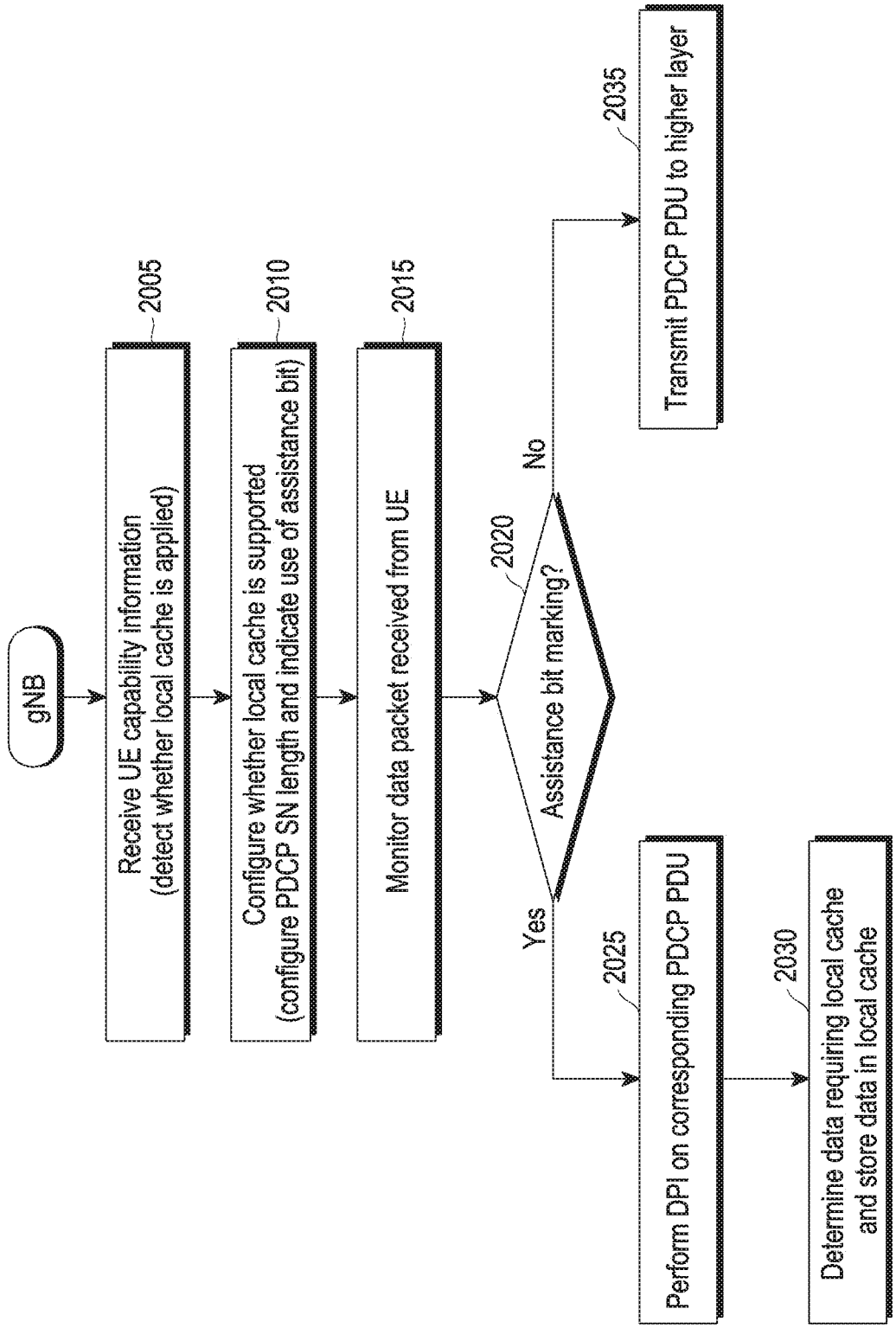
FIG. 20 illustrates the overall operation of the base station to which the disclosure is applied.

FIG. 20 illustrates the overall operation of the base station to which the disclosure is applied.

The base station receives UE capability information from the UE in step 2005 and, if the UE has capability to assist the local cache (that is, the UE is capable of marking the assistance bit on the PDCP PDU), determines and configures whether the local cache is supported in a specific condition in step 2010. The specific condition may be the case in which RRC connection reconfiguration is applied and also include a default connection configuration, a HO command, DC, and an RB change. When the application is determined, the base station configures a PDCP SN length to be a state in which the assistance bit can be applied in the corresponding UE. That is, the base station indicates PDCP configurations 1615, 1620, 1625, and 1630 of FIG. 16.

Thereafter, the base station monitors a data packet received from the UE in step 2015, and when an assistance bit of the received PDCP PDU is marked in step 2020, performs Deep Packet Inspection (DPI) on the corresponding PDCP PDU in step 2025. That is, the base station decodes the corresponding PDCP PDU in detail to analyze IP information of the corresponding packet and traffic (service) type, determines whether the data packet is data requiring the local cache, and then, if the local cache is required, stores the data packet in the local cache in step 2030.

Meanwhile, the base station transfers the data packet, which has no assistance bit marking of the PDCP PDU, received from the UE in step 2020 to a higher layer and performs data processing in step 2035.

Figure 21:
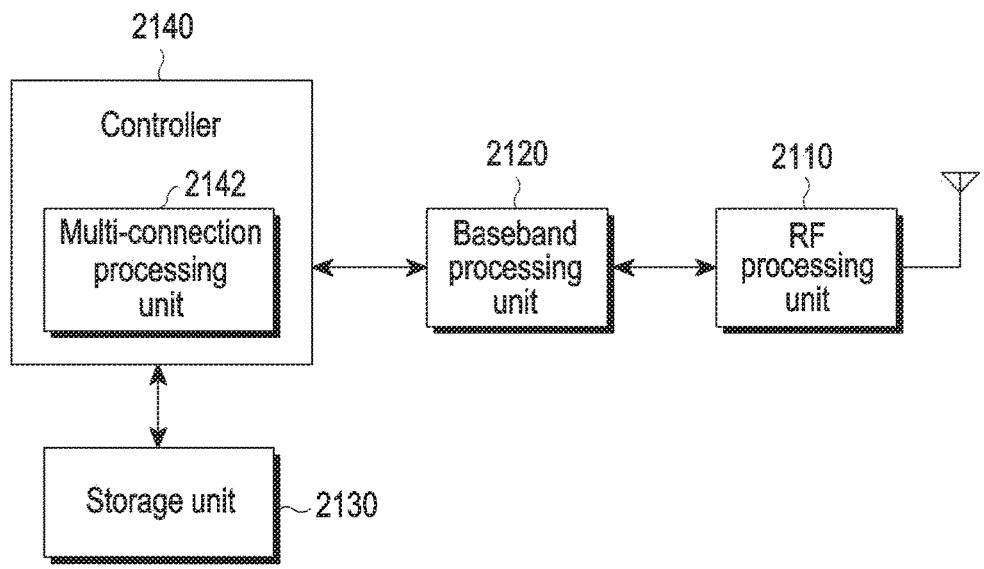
FIG. 21 is a block diagram illustrating the configuration of the UE according to the disclosure.

FIG. 21 is a block diagram illustrating the configuration of the UE according to the disclosure.

Referring to FIG. 21, the UE includes a Radio Frequency (RF) processing unit 2110, a baseband processing unit 2120, a storage unit 2130, and a controller 2140. Meanwhile, the UE may include only some of the elements or may further include an additional element that is not illustrated in FIG. 21.

The RF processing unit 2110 performs a function for transmitting and receiving a signal through a radio channel, such as band conversion and amplification of a signal. That is, the RF processing unit 2110 up-converts a baseband signal provided from the baseband processing unit 2120 into an RF band signal, transmits the RF band signal through an antenna, and then down-converts the RF band signal received through the antenna into a baseband signal. For example, the RF processing unit 2110 may include a transmission filter, a reception filter, an amplifier, a mixer, an oscillator, a Digital-to-Analog Converter (DAC), an Analog-to-Digital Converter (ADC), and the like. Although FIG. 21 illustrates only one antenna, the UE may include a plurality of antennas. In addition, the RF processing unit 2110 may include a plurality of RF chains. Moreover, the RF processing unit 2110 may perform beamforming. For the beamforming, the RF processing unit 2110 may control a phase and a size of each signal transmitted/received through a plurality of antennas or antenna elements. The RF processing unit may perform MIMO and receive a plurality of layers when performing the MIMO operation.

The baseband processing unit 2120 performs a function for a conversion between a baseband signal and a bitstream according to a physical layer standard of the system. For example, the baseband processing unit 2120, when transmitting data, generates complex symbols by encoding and modulating a transmission bitstream. In addition, the baseband processing unit 2120, when receiving data, recovers a reception bit string through the demodulation and decoding of a baseband signal provided from the RF processing unit 2110. For example, in an Orthogonal Frequency Division Multiplexing (OFDM) scheme, when data is transmitted, the baseband processing unit 2120 generates complex symbols by encoding and modulating a transmission bitstream, mapping the complex symbols to subcarriers, and then configures OFDM symbols through an Inverse Fast Fourier Transform (IFFT) operation and a Cyclic Prefix (CP) insertion. Further, when data is received, the baseband processing unit 2120 divides the baseband signal provided from the RF processing unit 2110 in the unit of OFDM symbols, reconstructs the signals mapped to the subcarriers through a Fast Fourier Transform (FFT) operation, and then reconstructs the reception bitstream through demodulation and decoding.

The baseband processing unit 2120 and the RF processing unit 2110 transmit and receive signals as described above. Accordingly, the baseband processing unit 2120 and the RF processing unit 2110 may be referred to as a transmission unit, a reception unit, a transmission/reception unit, or a communication unit. At least one of the baseband processing unit 2120 and the RF processing unit 2110 may include a plurality of communication modules in order to support a plurality of different radio access technologies. In addition, at least one of the baseband processing unit 2120 and the RF processing unit 2110 may include different communication modules in order to process signals of different frequency bands. For example, the different radio access technologies may include a wireless LAN (for example, IEEE 802.11) and a cellular network (for example, LTE). Further, the different frequency bands may include a Super High Frequency (SHF) (for example, 2.NRHz, NRhz) band and a millimeter (mm) wave (for example, 60 GHz) band.

The storage unit 2130 stores data such as a basic program, an application, and setting information for the operation of the UE. Particularly, the storage unit 2130 may store information related to a second access node for performing wireless communication using a second radio access technology. In addition, the storage unit 2130 provides data stored therein according to a request from the controller 2140.

The controller 2140 controls the overall operation of the UE. For example, the controller 2140 transmits/receives a signal through the baseband processing unit 2120 and the RF processing unit 2110. In addition, the controller 2140 may record data in the storage unit 2140 and read the data. To this end, the controller 2140 may include at least one processor. For example, the controller 2140 may include a Communication Processor (CP) that performs a control for communication, and an Application Processor (AP) that controls a higher layer such as an application. The controller 2140 may include at least one of a Central Processing Unit (CPU) and a Graphics Processing Unit (GPU).

Further, the storage unit 2130 may include at least one type of storage medium of a flash memory type, a hard disk type, a multimedia card micro type, a card type memory (for example, an SD memory, an XD memory or the like), a magnetic memory, a magnetic disk, an optical disk, a Random Access Memory (RANI), a Static RAM (SRAM), a Read-Only Memory (ROM), a Programmable Read-Only Memory (PROM), and an Electrically Erasable Programmable ROM (EEPROM). The controller 2140 may perform various operations using various programs, content, and data stored in the storage unit 2130.

Figure 22:
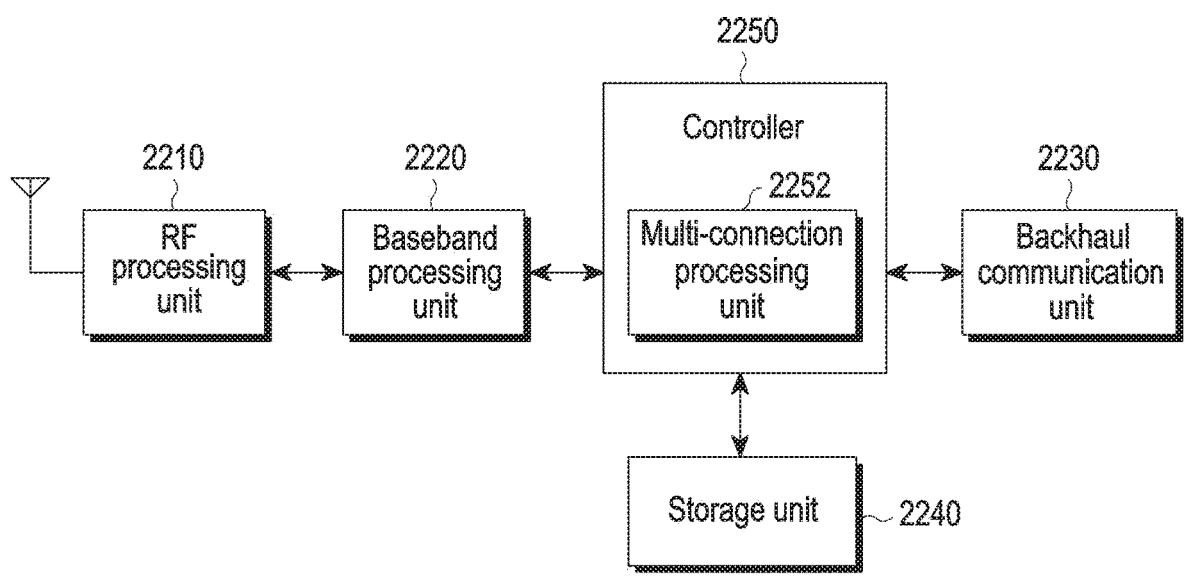
FIG. 22 is a block diagram illustrating the configuration of the base station according to the disclosure.

FIG. 22 is a block diagram illustrating the configuration of the base station according to the disclosure.

As illustrated in FIG. 22, the base station includes an RF processing unit 2210, a baseband processing unit 2220, a backhaul communication unit 2230, a storage unit 2240, and a controller 2250. Meanwhile, the base station may include only some of the elements or may further include an additional element that is not illustrated in FIG. 22.

The RF processing unit 2210 performs a function for transmitting and receiving a signal through a radio channel, such as band conversion and amplification of a signal. That is, the RF processing unit 2210 up-converts a baseband signal provided from the baseband processing unit 2220 into an RF band signal, transmits the RF band signal through an antenna, and then down-converts the RF band signal received through the antenna into a baseband signal. For example, the RF processing unit 2210 may include a transmission filter, a reception filter, an amplifier, a mixer, an oscillator, a DAC, and an ADC. Although FIG. 22 illustrates only one antenna, the first access node may include a plurality of antennas. In addition, the RF processing unit 2210 may include a plurality of RF chains. Moreover, the RF processing unit 2210 may perform beamforming. For the beamforming, the RF processing unit 2210 may control a phase and a size of each of the signals transmitted and received through a plurality of antennas or antenna elements.

The RF processing unit may perform a downlink MIMO operation by transmitting one or more layers.

The baseband processing unit 2220 performs a function of performing conversion between a baseband signal and a bitstream according to a physical layer standard of the first radio access technology. For example, when data is transmitted, the baseband processing unit 2220 generates complex symbols by encoding and modulating a transmission bitstream. In addition, when data is received, the baseband processing unit 2220 recovers a reception bit string through the demodulation and decoding of a baseband signal provided from the RF processing unit 2210. For example, in an OFDM scheme, when data is transmitted, the baseband processing unit 2220 may generate complex symbols by encoding and modulating the transmission bitstream, map the complex symbols to subcarriers, and then configure OFDM symbols through an IFFT operation and CP insertion. Further, when data is received, the baseband processing unit 2220 divides the baseband signal provided from the RF processing unit 2210 in the unit of OFDM symbols, reconstructs the signals mapped to the subcarriers through an FFT operation, and then reconstructs the reception bitstream through demodulation and decoding. The baseband processing unit 2220 and the RF processing unit 2210 transmit and receive signals as described above. Accordingly, the baseband processing unit 2220 and the RF processing unit 2210 may be referred to as a transmitter, a receiver, a transceiver, a communication unit, or a wireless communication unit.

The backhaul communication unit 2230 provides an interface for communicating with other nodes within the network. That is, the backhaul communication unit 2230 converts a bitstream transmitted to another node, for example, the SeNB or a core network from the MeNB, into a physical signal and converts the physical signal received from the other node into the bitstream.

The storage unit 2240 stores data such as a basic program, an application, and setting information for the operation of the MeNB. Particularly, the storage unit 2240 may store information on bearers allocated to the accessed UE and the measurement result reported from the accessed UE. Further, the storage unit 2240 may provide multiple connections to the UE and store information on a reference for determining whether to stop the multiple connections. In addition, the storage unit 2240 provides data stored therein according to a request from the controller 2250.

The controller 2250 controls the overall operation of the MeNB. For example, the controller 2250 transmits and receives a signal through the baseband processing unit 2220 and the RF processing unit 2210 or through the backhaul communication unit 2230. In addition, the controller 2250 may record data in the storage unit 2240 and read the data. To this end, the controller 2250 may include at least one processor (for example, a Central Processing Unit (CPU), a Graphics Processing Unit (GPU), or both of them).

Further, the storage unit 2240 may include at least one type of storage medium of a flash memory type, a hard disk type, a multimedia card micro type, a card type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). The controller 2250 may perform various operations using various programs, content, and data stored in the storage unit 2240.

Meanwhile, the exemplary embodiments disclosed in the specification and drawings are merely presented to easily describe technical contents of the disclosure and help the understanding of the disclosure and are not intended to limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiment 1, embodiment 2, and embodiment 3 of the disclosure are combined so as to employ a base station and a terminal. Although the embodiments are presented on the basis of the NR system, other modification examples based on technical idea of the embodiments can be applied to other systems such as an FDD or TDD LTE system.

Although exemplary embodiments of the disclosure are disclosed in the disclosure and the drawings and specific terms are used, they are merely used for the general meaning to easily describe the technology of the disclosure and assist understanding of the disclosure but do not limit the scope of the disclosure. It is obvious to those skilled in the art to which the disclosure pertains that other modified embodiments based on the technical idea of the disclosure besides the embodiments disclosed herein can be carried out.

The operations described above may be performed when a memory device storing the corresponding program code is included in a predetermined element within the base station or the UE. That is, the controller of the base station or UE may perform the above described operations by reading and executing the program code stored in the memory device by means of a processor or a central processing unit (CPU).

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   receiving, from a first base station, a radio resource control (RRC) connection reconfiguration message comprising first information indicating a dedicated random access resource and second information indicating a common random access resource;
   determining whether to perform a random access for a second base station based on the dedicated random access resource or the common random access resource; and
   performing the random access for the second base station using the dedicated random access resource, in case that the random access for the second base station is available based on the dedicated random access resource,
   wherein the RRC connection reconfiguration message further comprises a first timer associated with the dedicated random access resource and a second timer associated with the common random access resource, wherein the random access for the second base station is performed based on the common random access resource, in case that the first timer expires, and wherein the first timer is shorter than the second timer.

2. The method of claim 1, further comprising:

transiting to an RRC idle mode, in case that a random access response is not received until the second timer expires.

3. The method of claim 1, wherein the dedicated random access resource is associated with a synchronization signal (SS) block or a channel state information-reference signal (CSI-RS).

4. A terminal in a wireless communication system, the terminal comprising:

a transceiver; and a processor configured to:

receive, from a first base station via the transceiver, a radio resource control (RRC) connection reconfiguration message comprising first information indicating a dedicated random access resource and second information indicating a common random access resource, determine whether to perform a random access for a second base station based on the dedicated random access resource or the common random access resource, and perform, via the transceiver, the random access for the second base station using the dedicated random access resource, in case that the random access for the second base station is available based on the dedicated random access resource, wherein the RRC connection reconfiguration message further comprises a first timer associated with the dedicated random access resource and a second timer associated with the common random access resource, wherein the random access for the second base station is performed based on the common random access resource, in case that the first timer expires, and wherein the first timer is shorter than the second timer.

5. The terminal of claim 4, wherein the processor is further configured to:

transit to RRC idle mode, in case that a random access response is not received until the second timer expires.

6. The terminal of claim 4, wherein the dedicated random access resource is associated with a synchronization signal (SS) block or a channel state information-reference signal (CSI-RS).

* * * * *